(12) United States Patent
Suzuoki

(10) Patent No.: US 6,441,819 B1
(45) Date of Patent: Aug. 27, 2002

(54) METHODS AND APPARATUS FOR RECORDING AND INFORMATION PROCESSING, AND RECORDING MEDIUM THEREFOR

(75) Inventor: Masakazu Suzuoki, Tokyo (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/504,361

(22) Filed: Feb. 15, 2000

Related U.S. Application Data

(63) Continuation of application No. 08/853,705, filed on May 9, 1997, now Pat. No. 6,188,408.

(30) Foreign Application Priority Data

May 10, 1996 (JP) .......................................... P08-116301

(51) Int. Cl.$^7$ ................................................ G06T 17/20
(52) U.S. Cl. ...................... 345/423; 345/420; 345/421; 345/427; 345/428; 345/426
(58) Field of Search ................................. 345/420, 421, 345/423, 425, 427, 426, 428

(56) References Cited

U.S. PATENT DOCUMENTS

| | | | |
|---|---|---|---|
| 4,646,251 A | 2/1987 | Hayes et al. ................. | 364/518 |
| 4,819,192 A | 4/1989 | Kuragano et al. .......... | 345/421 |
| 4,994,989 A | 2/1991 | Usami et al. ................ | 345/428 |
| 5,193,145 A | 3/1993 | Akeley ........................ | 345/423 |
| 5,261,029 A | 11/1993 | Abi-Ezzi et al. ............. | 345/423 |
| 5,553,206 A | 9/1996 | Mashkat ...................... | 345/423 |
| 5,619,626 A | 4/1997 | Huddy ......................... | 345/421 |
| 6,188,408 B1 * | 2/2001 | Suzuoki ....................... | 345/423 |

FOREIGN PATENT DOCUMENTS

WO     WO 91/12588     8/1991

OTHER PUBLICATIONS

Foley et al. "Computer Graphics: Principle and Practice", second edition, chapter 12, pp. 533–562.*

* cited by examiner

Primary Examiner—Mark Zimmerman
Assistant Examiner—Kimbinh T. Nguyen
(74) Attorney, Agent, or Firm—Fulwider Patton Lee & Utecht, LLP

(57) ABSTRACT

A recording medium, recording and information processing apparatus and methods by which efficient processing of data and a high processing speed can be readily achieved at lower cost. A main CPU converts coordinates of a polygon in response to a manual operation of an operation unit by a user and transmits data of the polygon to a programmable packet engine via a main bus. The packet engine calculates a Z value representative of the position of the polygon in the depthwise direction from coordinate values of the apexes of the polygon supplied from the main CPU, divides the polygon into a number of sub-polygons corresponding to the Z value, converts coordinate values of the apexes of the sub-polygons in accordance with a normal vector and curved surface parameters and produces a curved surface composed of the sub-polygons. A graphical processing unit writes pixel data of the sub-polygons produced by the programmable packet engine into a frame buffer and performs rendering processing.

19 Claims, 21 Drawing Sheets

FIG. I

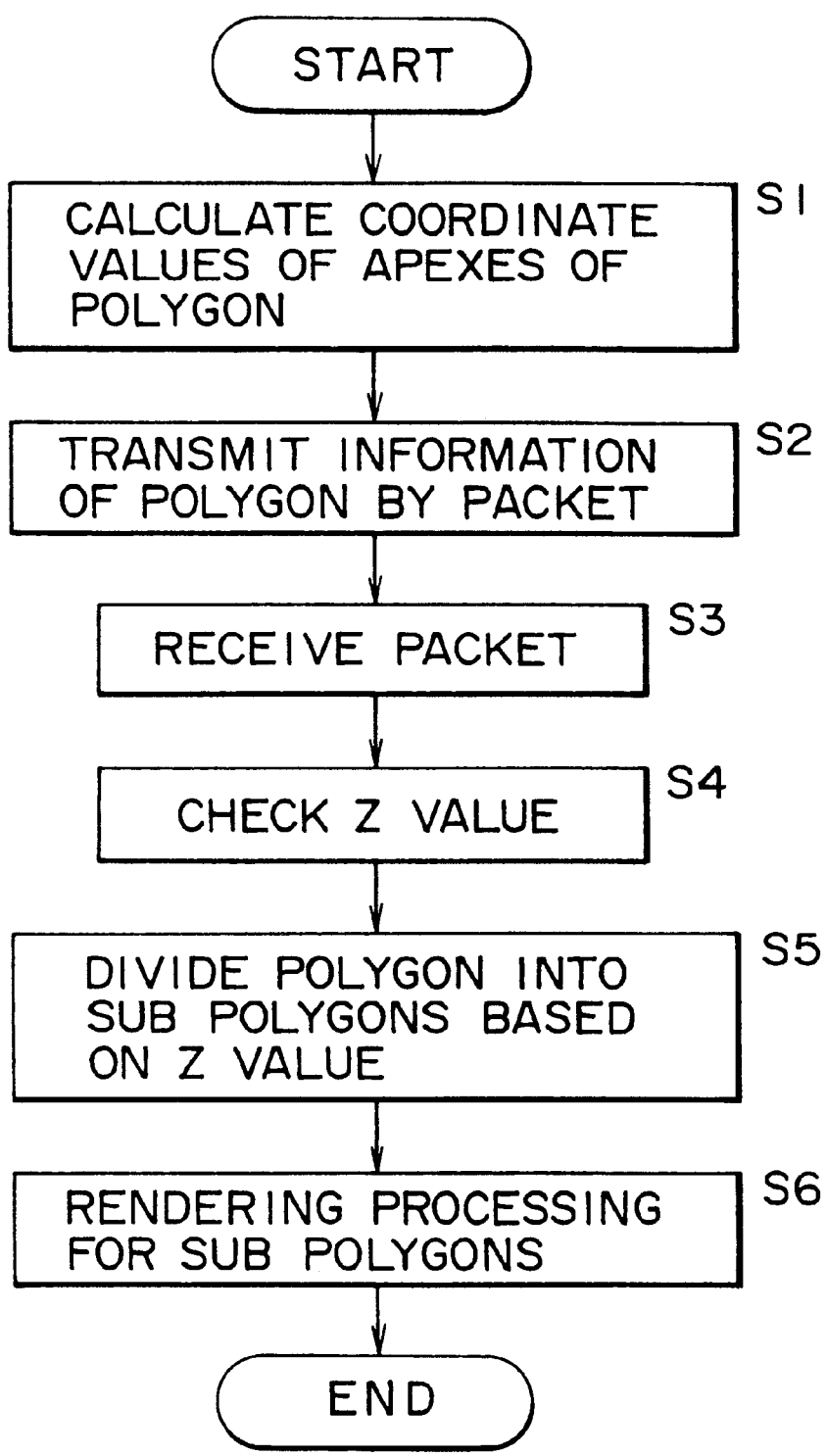

| CODE | Nx | Ny | Nz | | |
|------|----|----|----|----|----|
| CURVED FACE PARAMETER | | | | | |
| X0 | Y0 | Z0 | U0 | V0 | RGB0 |
| X1 | Y1 | Z1 | U1 | V1 | RGB1 |
| X2 | Y2 | Z2 | U2 | V2 | RGB2 |
| X3 | Y3 | Z3 | U3 | V3 | RGB3 |

NUMBER OF REPRESENTATIVE POINTS = 8

NUMBER OF POLYGONS = 12

NUMBER OF REPRESENTATIVE POINTS = 14

NUMBER OF POLYGONS = 24

NUMBER OF REPRESENTATIVE POINTS = 26

NUMBER OF POLYGONS = 48

F I G. 13

| CODE | Nx | Ny | Nz | |
|---|---|---|---|---|
| CURVED FACE PARAMETER | | | | |
| X0 | Y0 | Z0 | RGB0 | |
| X1 | Y1 | Z1 | RGB1 | |
| X2 | Y2 | Z2 | RGB2 | |
| X3 | Y3 | Z3 | RGB3 | |

6 WORDS

F I G. 14A
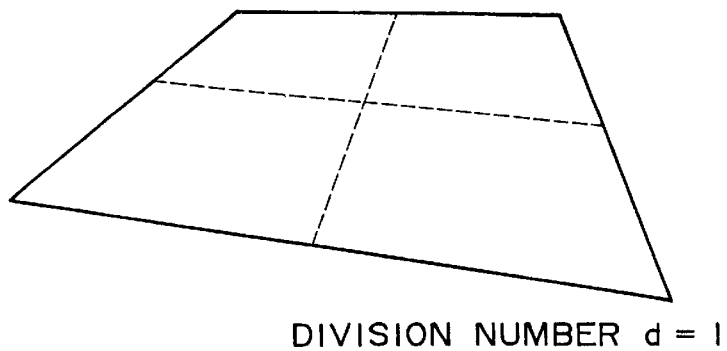
DIVISION NUMBER d = 1
F I G. 14B
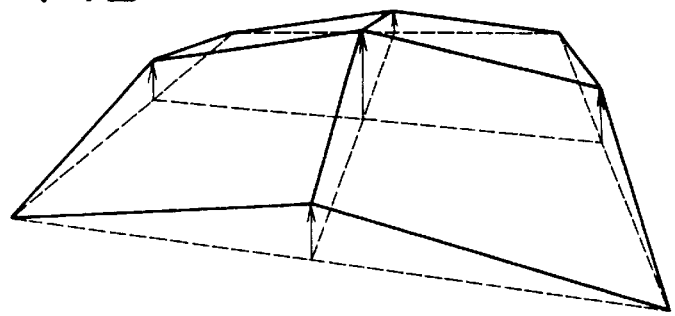
DIVISION NUMBER d = 4
F I G. 14C
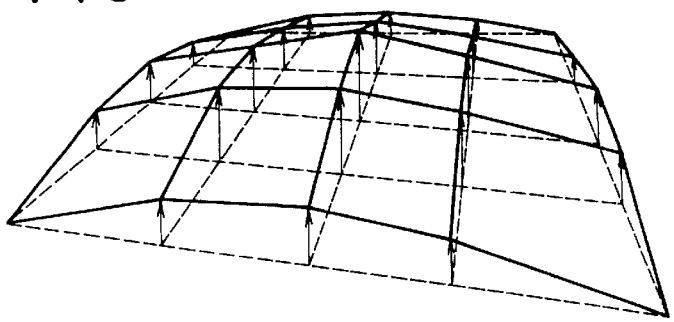
DIVISION NUMBER d = 16

| CODE | X | Y | Z | RGB |
|---|---|---|---|---|
| X0 | Y0 | Z0 | RGB0 |
| X1 | Y1 | Z1 | RGB1 |
| X2 | Y2 | Z2 | RGB2 |
| X3 | Y3 | Z3 | RGB3 |
| X4 | Y4 | Z4 | RGB4 |
| X5 | Y5 | Z5 | RGB5 |
| X6 | Y6 | Z6 | RGB6 |
| X7 | Y7 | Z7 | RGB7 |
| ......... | ......... | ......... | ......... |
| X17 | Y17 | Z17 | RGB17 |
| X22 | Y22 | Z22 | RGB22 |
| X18 | Y18 | Z18 | RGB18 |
| X23 | Y23 | Z23 | RGB23 |
| X24 | Y24 | Z24 | RGB24 |

F I G. 16

| POLYGON DIVISION NUMBER | INPUT DATA AMOUNT (WORDS) PER ONE POLYGON | OUTPUT DATA AMOUNT (WORDS) (STRIPE MESH) | DATA COMPRESSION RATIO (%) |
|---|---|---|---|
| 1 (NO DIVISION) | 6 | 5 | 120 |
| 2 × 2 | 6 | 12 | 50 |
| 4 × 4 | 6 | 40 | 15 |
| 8 × 8 | 6 | 144 | 4 |

| CODE | Nx | Ny | Nz | |
|------|----|----|----|---|
| LIGHT SOURCE PARAMETER | | | | |
| X0 | Y0 | Z0 | RGB0 | |
| X1 | Y1 | Z1 | RGB1 | |
| X2 | Y2 | Z2 | RGB2 | |
| X3 | Y3 | Z3 | RGB3 | |

$$L = h^2 / (h^2 + (p-p0)^2 + (q-q0)^2)$$

| X0 | Y0 | Z0 | RGB0 |
| X1 | Y1 | Z1 | RGB1 |
| X2 | Y2 | Z2 | RGB2 |
| X3 | Y3 | Z3 | RGB3 |
| X4 | Y4 | Z4 | RGB4 |
| X5 | Y5 | Z5 | RGB5 |
| X6 | Y6 | Z6 | RGB6 |
| X7 | Y7 | Z7 | RGB7 |
| ............ | ............ | | |
| X17 | Y17 | Z17 | RGB17 |
| X22 | Y22 | Z22 | RGB22 |
| X18 | Y18 | Z18 | RGB18 |
| X23 | Y23 | Z23 | RGB23 |
| X24 | Y24 | Z24 | RGB24 |

AXIS OF ROTATION

F I G. 21

| CODE | TEMPLATE PATTERN ID | | | |
|---|---|---|---|---|
| X0 | Y0 | Z0 | RGB0 | |
| X1 | Y1 | Z1 | RGB1 | |
| X2 | Y2 | Z2 | RGB2 | |
| X3 | Y3 | Z3 | RGB3 | |
| n00 | n01 | n02 | n03 | |
| n04 | n05 | n06 | n07 | |
| n10 | n11 | n12 | n13 | |
| | | | | |
| | | | | |
| n70 | n71 | n72 | n73 | |
| n74 | n75 | n76 | n77 | |

←COORDINATE POINT COORDINATES OF TEMPLATE→ ←LIST OF DIFFERENCES FROM TEMPLATE→

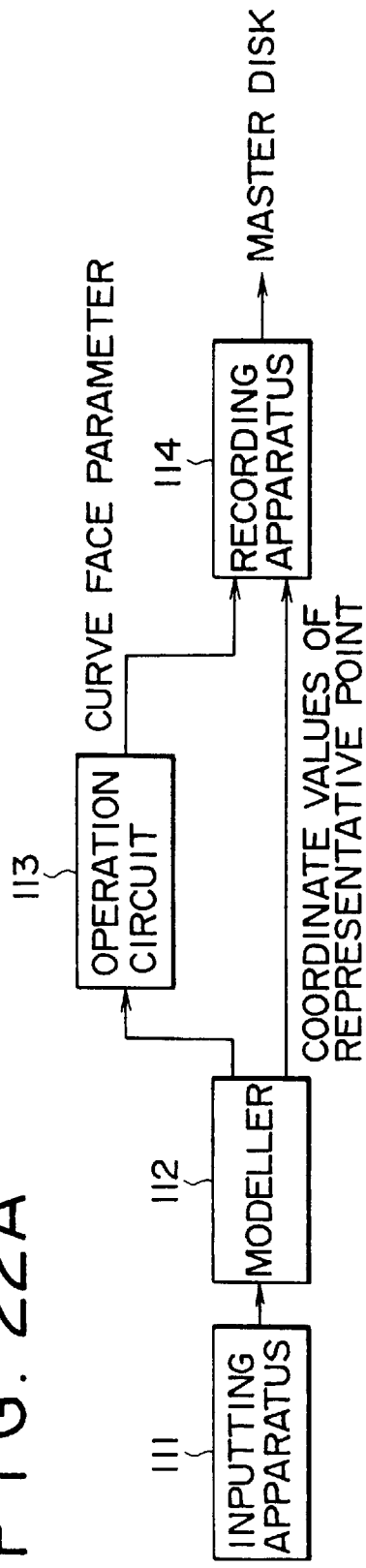
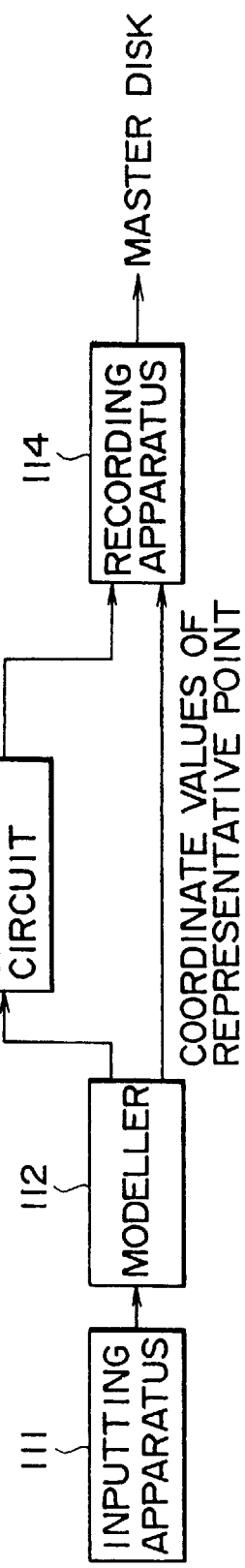
FIG. 22A
FIG. 22B

METHODS AND APPARATUS FOR RECORDING AND INFORMATION PROCESSING, AND RECORDING MEDIUM THEREFOR

RELATED APPLICATIONS

This is a continuation of Ser. No. 08/853,705, filed May 9, 1997, now U.S. Pat. No. 6,188,408 which claims priority to Japanese appl. no. P08-116301; filed May 10, 1996.

BACKGROUND OF THE INVENTION

1. Field of the Invention

This invention relates generally to improvements in recording and information processing methods and apparatus and a recording medium therefor and, more particularly, to a new and improved recording medium, recording and information processing systems facilitating efficient and high speed processing at reduced cost.

2. Description of the Related Art

Recently, television game machines for home use or personal computers which effect picture drawing processing at a high speed, to allow a user to enjoy a game or the like, have become less expensive and have spread to a large number of homes.

In order to produce computer graphics (CG) or to develop software which uses the computer graphics, a graphic computer which effects picture drawing processing at a higher speed is used.

Such television game machines for home use, personal computers and graphic computers as described above typically include a picture drawing apparatus composed of a memory, a CPU (central processing unit) and other operation circuits. In the picture drawing apparatus, image data to be displayed on a display section of a television receiver or a display unit for exclusive use, that is, display data, are produced by the CPU, and the data thus produced are outputted to a frame buffer provided for holding values for pixels of the display section, so that high speed picture drawing processing is effected by the picture drawing circuit for exclusive use.

The CPU of the picture drawing apparatus effects geometry processing such as coordinate conversion, clipping and light source calculation to produce picture drawing commands for drawing a graphic form of a three-dimensional solid object in the form of a combination of basic plane figures (polygons) having such shapes as triangles or quadrangles and supplies the picture drawing commands to the picture drawing circuit.

The picture drawing circuit calculates values of pixels constructing the polygons from color data of the apexes of the polygons and Z values indicating positions of the polygons in the depthwise-direction in the three-dimensional space displayed two-dimensionally on the predetermined display section, in accordance with the picture drawing commands received from the CPU, and then writes the values into the frame buffer (rendering processing) and draws a picture of the polygons.

Such a picture drawing circuit as described above is directly coupled to the CPU by a bus for exclusive use to prevent otherwise possible concentration of a load (data transmitted and received via a bus) on a different bus used commonly together with a different circuit (for example, a recording apparatus or a memory which holds data). It is to be noted that, when picture drawing processing is to be performed, for example, at a speed of approximately 15 MPolygon/sec (rendering processing of 15 $10^6$ polygons is performed for one second) making use of the different bus used commonly together with the different circuit, the amount of data which are communicated along the bus used commonly together with the different circuit comes up to 100 MB/sec to 200 MB/sec (100 to 200 megabytes per second). Accordingly, a bus of a large capacity is required for the commonly used bus.

The data outputted from the CPU are stored once into a FIFO (first-in first-out) buffer interposed between the CPU and the picture drawing circuit and are supplied in the recorded order to the picture drawing circuit. The FIFO buffer successively stores therein and supplies the stored data to the picture drawing circuit such that, when the supplying rate of data by the CPU is temporarily higher than the processing speed of the picture drawing circuit, the stored amount of data thereof gradually increases, but the stored amount of data thereof gradually decreases when the supplying rate of data by the CPU is lower than the processing speed of the picture drawing circuit. In this manner, the FIFO buffer absorbs an imbalance between the data supplying rate of the CPU and the processing speed of the picture drawing circuit.

However, when the data supplying rate of the CPU exceeds the processing speed of the picture drawing circuit very much, or when a condition wherein the data supplying rate of the CPU is higher than the processing speed of the picture drawing circuit continues for a long period of time due to load conditions to the CPU and the picture drawing circuit, non-processed data are gradually accumulated in the FIFO buffer. Then, when the amount of such non-processed data exceeds the capacity of the FIFO buffer, matching of data is lost and, consequently, operation of the CPU and the picture drawing circuit stops. Therefore, such picture drawing apparatus has a disadvantage in that it is difficult to effect processing efficiently.

Another disadvantage of the picture drawing apparatus is that, in order to effect picture drawing processing at a high speed, as the amount of data to be processed for picture drawing increases, the capacity of the memory and the capacity of the recording medium required increase and, accordingly, it is difficult to achieve lower in cost.

In addition, the aforedescribed picture drawing apparatus suffers from the further disadvantage that, as the amount of data to be processed increases, the time required to read out data from the recording medium or the memory increases and, consequently, it is difficult to achieve a high processing speed.

Accordingly, these has been a long existing need for a new and improved recording medium and recording and information processing systems facilitating efficient and high speed processing at reduced cost. The present invention clearly fulfills these needs.

SUMMARY OF THE INVENTION

Briefly, and in general terms, the present invention provides a recording medium and a recording apparatus and method as well as an information processing apparatus and method by which efficient processing of data and a high processing speed can be achieved and reduction in cost can be achieved readily.

More particularly, by way of example and not necessarily by way of limitation, the present invention provides a recording medium wherein it holds thereon, as data of a predetermined object in a three-dimensional space, identification information of a basic object which makes a reference and difference values between coordinate values of apexes of the basic object and coordinate values of apexes of the predetermined object.

With the recording medium, since it holds thereon, as data of a predetermined object in a three-dimensional space, identification information of a basic object which makes a reference and difference values between coordinate values of apexes of the basic object and coordinate values of apexes of the predetermined object, the amount of data for each individual object is relatively small. Consequently, the recording medium can hold data for a comparatively large number of objects thereon.

According to another aspect of the present invention, there is provided a recording apparatus for recording data of a predetermined object in a three-dimensional space onto a recording medium, comprising calculation means for calculating, from the object in the three-dimensional space, identification information of a basic object which makes a reference and difference values between coordinate values of apexes of the basic object and coordinate values of apexes of the predetermined object, and recording means for recording the identification information and the difference values calculated by the calculation means as data of the predetermined object.

The present invention further provides a recording method for recording data of a predetermined object in a three-dimensional space onto a recording medium, comprising the steps of calculating, from the predetermined object in the three-dimensional space, identification information of a basic object which makes a reference and difference values between coordinate values of apexes of the basic object and coordinate values of apexes of the predetermined object, and recording the identification information and the difference values calculated in the calculating step as data of the predetermined object.

With the aforedescribed recording apparatus and the recording method, since, from a predetermined object in a three-dimensional space, identification information of a basic object which makes a reference and difference values between coordinate values of apexes of the basic object and coordinate values of apexes of the predetermined object are calculated and the identification information and the difference values thus calculated are recorded as data of the predetermined object, a recording medium which holds data of a comparatively large number of objects thereon can be produced.

The present invention also provides an information processing apparatus, comprising read-out means for reading out, from a recording medium on which data of a three-dimensional object composed of a plurality of plane figures in a three-dimensional space are recorded, the data, first conversion means for converting the plane figures into a curved surface composed of a number of plane figures corresponding to a display size on a predetermined display section, and second conversion means for converting data of the curved surface obtained by the conversion by the first conversion means into two-dimensional display data.

In accordance with another aspect of the present invention, there is provided an information processing method, comprising the steps of reading out, from a recording medium on which data of a three-dimensional object composed of a plurality of plane figures in a three-dimensional space are recorded, the data, converting the plane figures into a curved surface composed of a number of plane figures corresponding to a display size of a predetermined display section, and converting data of the curved surface obtained by the conversion by the first conversion means into two-dimensional display data.

With this information processing apparatus and the information processing method, since a plane figure is converted into a curved surface composed of a number of plane figures corresponding to a display size on a predetermined display section, the amount of data to be handled can be reduced and the burden to a bus can be reduced.

In accordance with to a further aspect of the present invention, there is provided an information processing apparatus, comprising read-out means for reading out, from a recording medium on which data of a three-dimensional object composed of a plurality of plane figures in a three-dimensional space are recorded, the data, division means for dividing the plane figures in accordance with a display size on a predetermined display section, calculation means for calculating brightness values of the plane figures obtained by the division from brightness values of the original plane figures, and production means for producing two-dimensional display data from the brightness values of the plane figures obtained by the division.

In addition, the present invention provides an information processing method, comprising the steps of reading out, from a recording medium on which data of a three-dimensional object composed of a plurality of plane figures in a three-dimensional space are recorded, the data, dividing the plane figures in accordance with a display size on a predetermined display section, calculating brightness values of the plane figures obtained by the division from brightness values of the original plane figures, and producing two-dimensional display data from the brightness values of the plane figures obtained by the division.

Accordingly, with the information processing apparatus and method of the present invention, since a plane figure is divided in accordance with a display size on a predetermined display section and brightness values of plane figures obtained by the division are calculated from brightness values of the original plane figure, the amount of data to be handled can be reduced and the burden to a bus can be reduced.

Hence, the present invention satisfies a long existing need for a new and improved recording medium and recording and information processing systems facilitating efficient and high speed processing at reduced cost.

The above and other objects, features and advantages of the present invention will become apparent from the following more de tailed description and the appended claims, when taken in conjunction with the accompanying drawings in which like parts or elements are denoted by like reference characters.

BRIEF DESCRIPTION OF THE DRAWINGS

FIG. 7 is a flow chart illustrating polygon picture drawing processing in the game machine of FIG. 1;

FIG. 13 is a table showing a data format of a polygon processed by the game machine of FIG. 1;

FIGS. 14A to 14C are perspective views illustrating different varieties of division of the polygon illustrated in FIG. 13;

FIG. 16 is a table showing different amounts of data handled by the programmable packet engine shown in FIG. 5;

FIG. 21 is a table showing a data format representing a three-dimensional object which makes use of a template; and FIGS. 22A and 22B are block diagrams showing production apparatus as recording apparatus to which the present invention is applied.

DESCRIPTION OF THE PREFERRED EMBODIMENT

Figure 1:
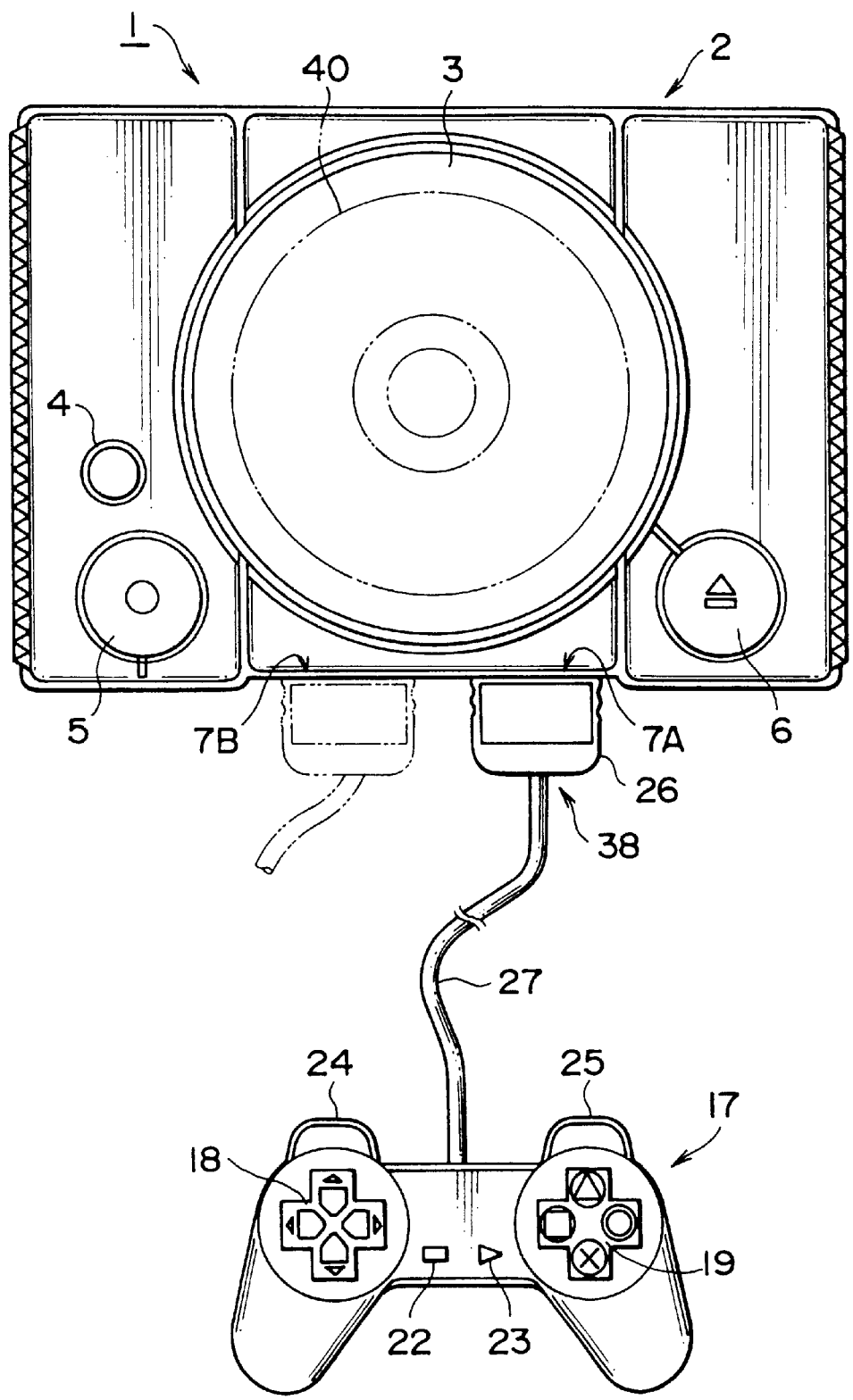
FIG. 1 is a plan view showing a game machine for home use to which an information processing apparatus of the present invention is applied.
Figure 2:
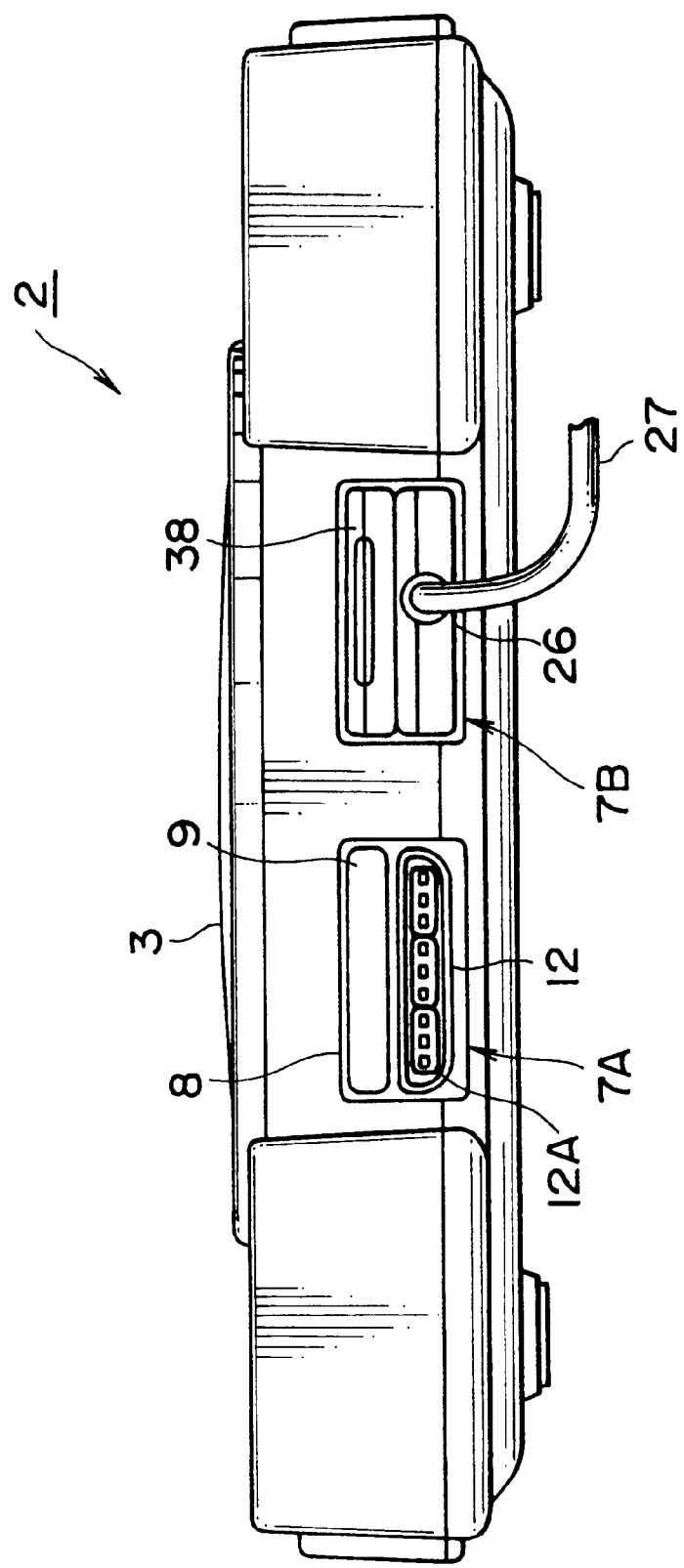
FIG. 2 is a front elevational view of the game machine of FIG. 1.
Figure 3:
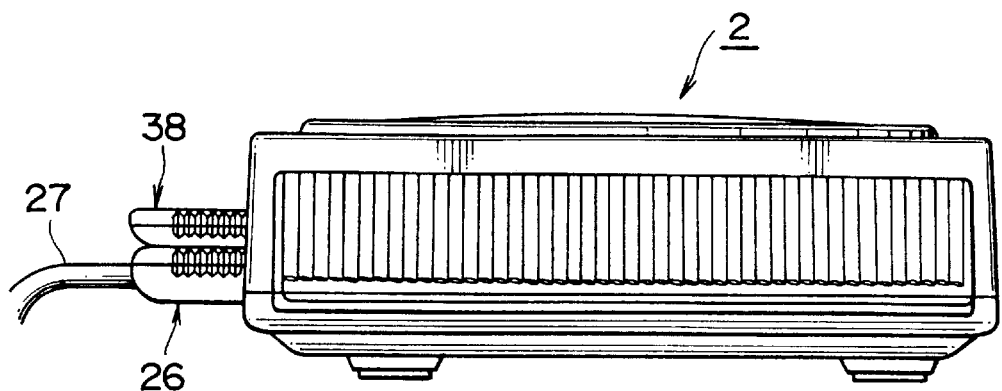
FIG. 3 is a side elevational view of the game machine of FIG. 1.

Referring now to the drawings, FIGS. 1 to 3 show an example of TV game machine for home use to which an information processing apparatus of the present invention is applied. This game machine 1 for home use is composed of a game machine body 2, and an operation unit 17 and a recording unit 38 which can be connected to the game machine body 2.

Figure 4:
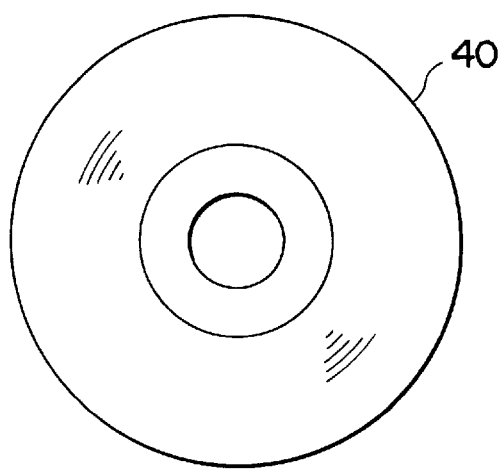
FIG. 4 is a plan view showing a CD-ROM which can be reproduced by the game machine of FIG. 1.

The game machine body 2 is formed in a substantially quadrangular shape as shown in FIGS. 1 to 3 and has, at a central position thereof, a disk loading station 3 onto which a CD-ROM (compact disk ROM (read only memory)) 40 which is an optical disk as shown in FIG. 4 and serves as a medium for a game to be loaded, and has, at suitable positions of the game machine body, a reset switch 4 for arbitrarily resetting a game, a power supply switch 5 for switching a power supply on/off, a disk operation switch 6 for operating loading of a disk, and connection sections 7A and 7B for connecting the operation unit 17 for performing operations of a game or the like and the recording unit 38 into which setting of such a game is to be recorded.

The connection sections 7A and 7B are each formed in two stages as shown in FIGS. 2 and 3. At the upper stage of each of the connection sections 7A and 7B, a recording insertion section 8 for connection of the recording unit 38 is provided, and at the lower stage, a connection terminal insertion section 12 for connection of the operation unit 17 is provided.

The recording insertion section 8 has an insertion hole of a rectangular shape elongated in horizontal directions, and has, in the inside of the insertion hole, a memory connecting terminal member (not shown) to which the recording unit 38 is connected. Further, as shown in FIG. 2, the recording insertion section 8 has a shutter 9 provided therein for protecting the memory connecting terminal member from dust and so forth. It is to be noted that the recording unit 38 has an electrically rewritable ROM so that data relating to a game may be recorded.

In order to mount the recording unit 38, a user will push, at an end of the recording unit 38, the shutter 9 in the inward direction and further push the recording unit 38 into the insertion hole until it is connected to the memory connecting terminal member.

The connection terminal insertion section 12 has, as shown in FIG. 2, an insertion hole of a rectangular shape elongated in horizontal directions and a connection terminal 12A for connection of a connection terminal member 26 of the operation unit 17.

The operation unit 17 has a structure wherein, as seen from FIG. 1, it can be held by the palms of the two hands and the five fingers can move freely to manually operate the operation unit 17, and has operation sections 18 and 19 disposed in a leftwardly and rightwardly symmetrical relationship thereon, a select switch 22 and a start switch 23 provided at an inter mediate portion between the operation sections 18 and 19, operation members 24 and 25 located on the front surface sides of the operation sections 18 and 19, and the connection terminal member 26 and a cable 27 for connection to the game machine body 2.

Figure 5:
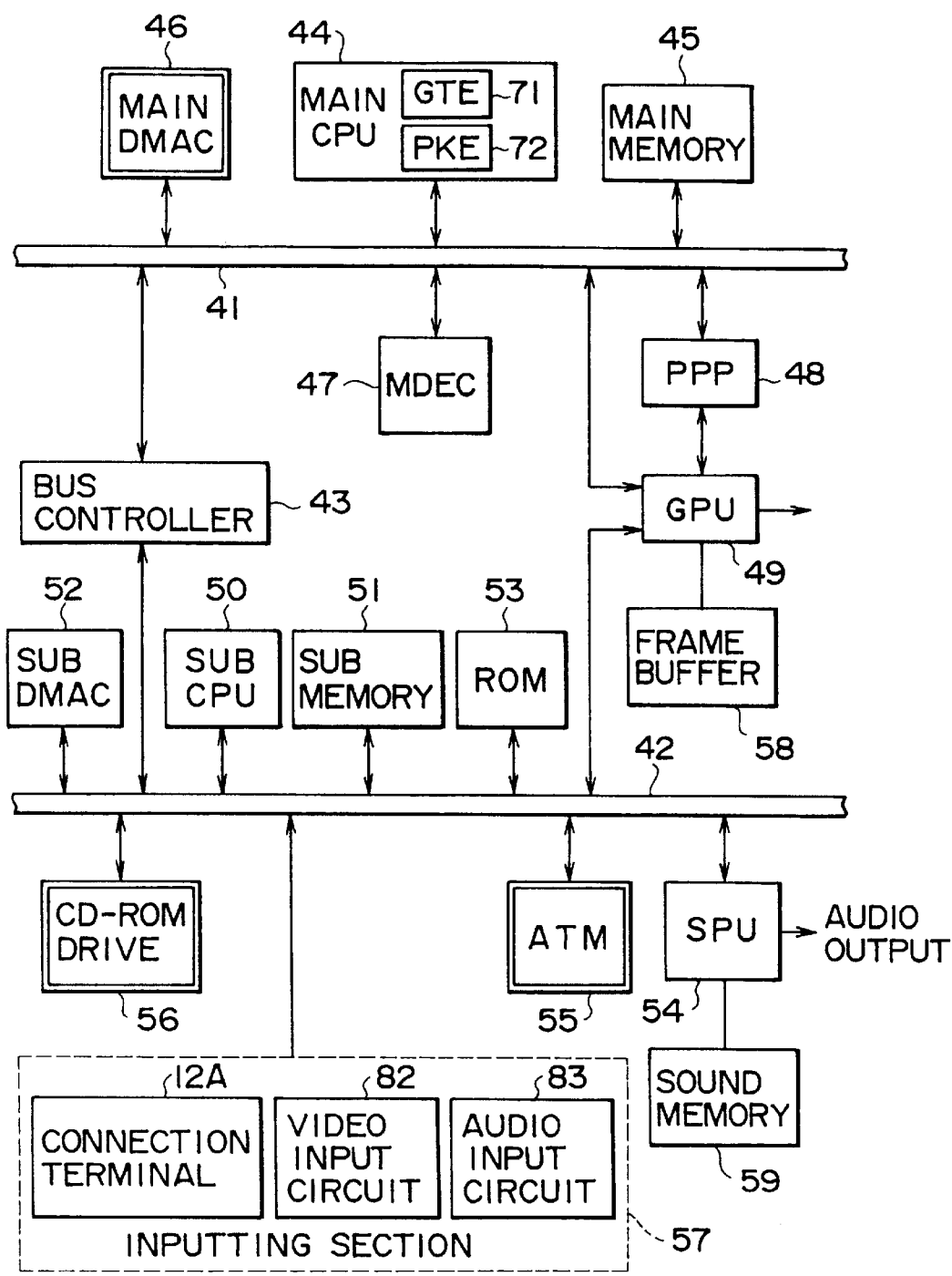
FIG. 5 is a system block diagram for the game machine of FIG. 1.

FIG. 5 shows an exemplary electric construction of the game machine body 2 described above.

The game machine body 2 has two buses including a main bus 41 and a sub-bus 42. The buses 41 and 42 are connected to each other via a bus controller 43.

Connected to the main bus 41 are a main CPU 44 formed from a microprocessor or the like and serving as read-out means and coordinate conversion means, a main memory 45 formed from a RAM (read only memory), a main direct memory access controller (main DMAC) 46, an MPEG decoder (MDEC) 47, a programmable packet engine (PPP) 48 serving as first conversion means, division means and calculation means, and a graphical processing unit (GPU) 49 serving as second conversion means and production means.

Meanwhile, connected to the sub-bus 42 are a sub-CPU 50 formed from a microprocessor or the like, a sub-memory 51 formed from a RAM, a sub-direct memory access controller (sub DMAC) 52, a ROM 53 in which programs such as an operating system are stored, a sound processing unit (SPU) 54, a communication control section (ATM) 55, a CD-ROM drive 56 serving also as the disk loading station 3, an inputting section 57, and a graphical processing unit 49.

The bus controller 43 connects the main bus 41 and the sub-bus 42 to each other and outputs data from the main bus 41 to the sub-bus 42 and outputs data from the sub-bus 42 to the main bus 41.

The main CPU 44 reads in, upon starting of the game machine body 2, a start program from the ROM 53 connected to the sub-bus 42 via the bus controller 43 and executes the start program so that the operating system may operate.

The main CPU 44 controls the CD-ROM drive 56 to read out an application program or data from the CD-ROM 40 loaded in position in the CD-ROM drive 56 and store the application program or data into the main memory 45.

The main CPU 44 includes a geometry calculation engine or graphic transfer engine (GTE) 71 for effecting geometry calculation such as coordinate conversion for data (coordinate values of the apexes (representative points) and so forth of a polygon) of a three-dimensional object formed from a plurality of basic figures, that is, polygons, and a packet engine (PKE) 72 for transmitting data calculated by the graphic transfer engine 71 as a packet to the programmable packet engine 48 via the main bus 41.

The graphic transfer engine 71 includes a plurality of operation elements for calculating a real number of the floating point and effects floating point calculations parallelly. The packet engine 72 supplies data of a polygon calculated by the graphic transfer engine 71 as a packet to the programmable packet engine 48 via the main bus 41.

The programmable packet engine 48 converts, from information of a polygon included in a packet supplied thereto from the packet engine 72 of the main CPU 44, the polygon into a curved surface composed of a plurality of small polygons and outputs data of the curved surface to the graphical processing unit 49.

Figure 6:
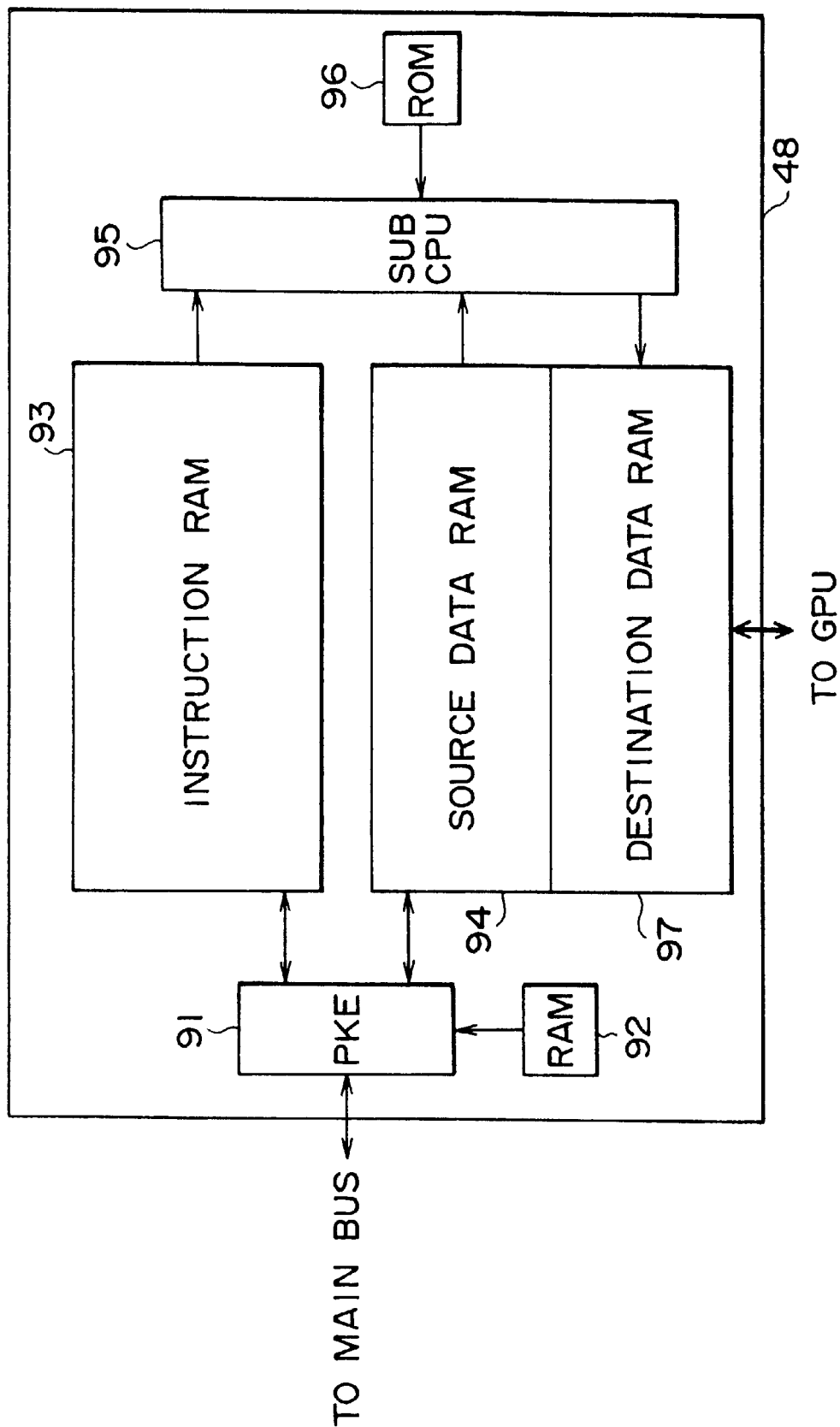
FIG. 6 is a block diagram of a programmable packet engine shown in FIG. 5.

FIG. 6 shows an exemplary construction of the programmable packet engine 48. A packet engine 91 receives a packet transferred from the packet engine 72 of the main CPU 44 and temporarily stores the packet into a RAM 92. Then, the packet engine 91 stores, from among data included in the packet, data which designate a program for processing a polygon (such data will be hereinafter described) into an instruction RAM 93 and stores the other data (coordinate data of the apexes of the polygon) into a source data RAM 94.

A sub-CPU 95 operates in accordance with a program stored in a ROM 96, and reads out, when data are stored into the instruction RAM 93, the data and divides, based on a program designated by the data (the program always resides in the sub-CPU 95), from-data of a polygon (coordinate data of the apexes of the polygon and so forth) stored in the source data RAM 94, the polygon into a number (in particular, a number corresponding to a display size when the polygon is to be displayed on the predetermined display section) of polygons (sub-polygons) corresponding to the position (Z value) of the polygon in the depthwise direction in the three-dimensional space.

In this instance, the sub-CPU 95 produces sub-polygons along a reference curved surface represented by curved surface parameters (which will be hereinafter described) included in a packet supplied thereto from the packet engine 72 (that is, produces a curved surface composed of a plurality of sub-polygons).

Then, the sub-CPU 95 stores coordinate values of the apexes of a plurality of polygons thus produced into a destination data RAM 97 so that they may be supplied to the graphical processing unit 49.

Referring back to FIG. 5, the graphical processing unit 49 reads out data of coordinate values (three-dimensional) of polygons after division and so forth from the destination data RAM 97 of the programmable packet engine 48. Then, the graphical processing unit 49 converts the three-dimensional coordinate values into two-dimensional coordinate values for the predetermined display section, produces pixel data corresponding to the polygons from the data, writes the pixel data into a frame buffer 58 and effects rendering processing. It is to be noted that, in this instance, the graphical processing unit 49 calculates, from three-dimensional coordinate values (x, y, z), two-dimensional coordinate values (X, Y) for displaying making use of the following expressions (perspective conversion).

$X=x/z, Y=y/z$

The main direct memory access controller 46 effects control such as DMA transfer for the various circuits connected to the main bus 41. Further, the main direct memory access controller 46 can also effect control such as DMA transfer for the various circuits connected to the sub-bus 42 in response to a state of the bus controller 43. Meanwhile, the MPEG decoder 47 operates parallelly to the main CPU 44 and decompresses data compressed by the MPEG system or the JPEG system.

The sub-CPU 50 effects various operations in accordance with a program stored in the ROM 53. The sub-direct memory access controller 52 effects control such as DMA transfer for the various circuits connected to the sub-bus 42 only in a condition wherein the main bus 41 and the sub-bus 42 are disconnected from each other by the bus controller 43.

The sound processing unit 54 reads out sound data from a sound memory 59 in response to a sound command supplied from the sub-CPU 50 or the sub-direct memory access controller 52 and outputs the sound data as an audio output.

The communication control section 55 (ATM in FIG. 5) is connected to a public network and effects transmission and reception of data via the public network.

The inputting section 57 includes the connection terminal 12A for connection of the operation unit 17, a video input circuit 82 for receiving video data from a different apparatus (not shown) and an audio input circuit 83 for receiving audio data from the different apparatus.

Subsequently, operation of the television game machine 1 for home use upon picture drawing processing of a polygon will be described with reference to a flow chart of FIG. 7.

First in step S1, the main CPU 44 receives a signal corresponding to a manual operation of the operation unit 17 by a user via the inputting section 57.

Then, the main CPU 44 reads out data of a polygon (coordinate values of the apexes, a normal vector, data of a reference curved surface (curved surface parameters)) (read out from the CD-ROM 40 in advance) from the main memory 45, and converts the coordinates of the polygon by the graphic transfer engine 71 in response to an operation of the user.

Then, in step S2, the packet engine 72 of the main CPU 44 transmits the coordinate values of the apexes of the polygon, the normal vector of the polygon, the curved surface parameters to be used by the programmable packet engine 48 and an identifier which designates a program to be used for production of a curved surface to be composed of a plurality of polygons by the programmable packet engine 48 as a single packet to the packet engine 91 of the programmable packet engine 48 via the main bus 41.

It is to be noted that the packet may otherwise be transmitted to the programmable packet engine 48 making use of the main direct memory access controller 46.

Figures 8A, 8B:
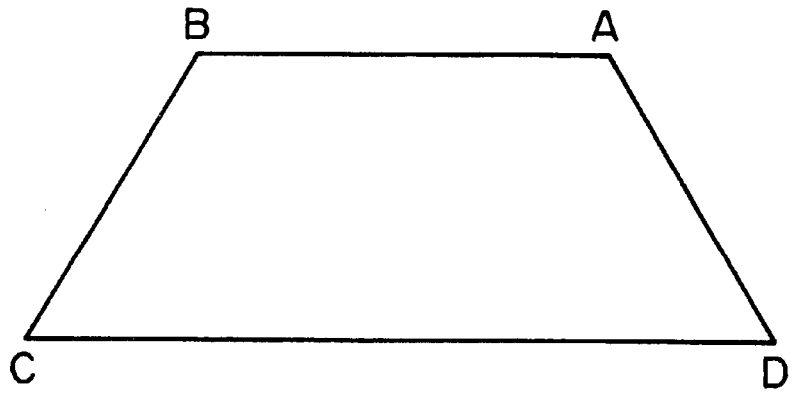
FIG. 8A is a diagrammatic view showing a polygon processed by the game machine of FIG. 1.
FIG. 8B is a table showing a data format of the polygon.

For example, if such a quadrangular polygon having apexes P0 to P3 as shown in FIG. 8A is produced by the coordinate conversion of the graphic transfer engine 71, then the packet engine 72 transmits a packet including, as shown in FIG. 8B, an identifier (Code in FIG. 8B) which designates a program, a normal vector (Nx, Ny, Nz in FIG. 8B) of the polygon, curved surface parameters representative of a reference curved surface, coordinate values (Xi, Yi, Zi) (i=0, . . . , 3) corresponding to the apexes P0 to P3, values (ui, vi) (i=0, . . . , 3) of parameters (hereinafter described) of the reference curved surface corresponding to the coordinate values and color data values RGBi (i=0, . . . , 3) to the packet engine 91 of the programmable packet engine 48.

It is to be noted that the format of the packet is set in accordance with the identifier Code so that the program designated by the identifier Code may be processed.

It is to be noted that, for example, where a program for processing a reference curved surface as a quadratic surface is designated by the identifier Code, the reference curved surface (x, y, z) is represented, making use of parameters u and v, by the following expressions:

$$x = fx(u, v) = a_{01}u^2 + a_{01}v^2 + a_{02}uv + a_{03}u + a_{03}v + a_{04}$$

$$y = fy(u, v) = a_{11}u^2 + a_{11}v^2 + a_{12}uv + a_{13}u + a_{13}v + a_{14}$$

$$z = fz(u, v) = a_{21}u^2 + a_{21}v^2 + a_{22}uv + a_{23}u + a_{23}v + a_{24}$$

Then, of the constants $a_{01}$ to $a_{24}$ in the expressions above, a predetermined number of non-zero constants $a_{ij}$ are transmitted as curved surface parameters to the programmable packet engine 48.

Further, where a program for processing a reference curved surface as a spherical surface is designated by the identifier Code, a spherical surface with a radius R and center coordinates (xc, yc, zc) represented by the following expressions making use of the parameters u and v is utilized as a reference curved surface (x, y, z):

$$x = R \cos v \cos u + xc$$

$$y = R \sin v + yc$$

$$z = R \cos v \sin u + zc$$

Then, the radius R and the center coordinates (xc, yx, zc) of the spherical surface are transmitted as curved surface parameters to the programmable packet engine 48.

Referring back to FIG. 7, in step S3, the packet engine 91 of the programmable packet engine 48 stores the packet supplied thereto from the packet engine 72 of the main CPU 44 once into the RAM 92 and stores, from among data included in the packet, the identifier (Code) designating a program into the instruction RAM 93 and stores the coordinate values of the apexes of the polygon, the values of the parameters, the normal vector of the polygon and the curved surface parameters into the source data RAM 94.

In step S4, the sub-CPU 95 of the programmable packet engine 48 reads out the identifier Code from the instruction RAM 93. Then, the sub-CPU 95 performs processing using a program corresponding to the value of the identifier Code. Further, the sub-CPU 95 reads out data such as the coordinate values of the apexes of the polygon and calculates a Z value representative of the position of the polygon in the depthwise direction.

Then, in step S5, the sub-CPU 95 reads out the values of the parameters u and v and the curved surface parameters from the source data RAM 94, calculates a middle point among the apexes of the polygon in a space ((u, v) space) defined by the parameters u and v, and produces sub-polygons from the middle point and the apexes of the polygon, or in other words, divides the polygon.

It is to be noted that, since the middle point produced in the (u, v) space is disposed on the reference curved surface by mapping it in the (x, y, z) space using the expression of the reference curved surface represented by the curved surface parameters, sub-polygons along the reference curved surface are formed from the middle point and the apexes of the polygon, that is, a curved surface composed of sub-polygons is produced.

Then, the sub-CPU 95 recursively- divides the sub-polygons until the display size (display area A) of the sub-polygons becomes smaller than a predetermined reference value D.

The sub-CPU 95 stores coordinate values of the apexes of sub-polygons produced in this manner into the destination data RAM 97.

Figure 9A:
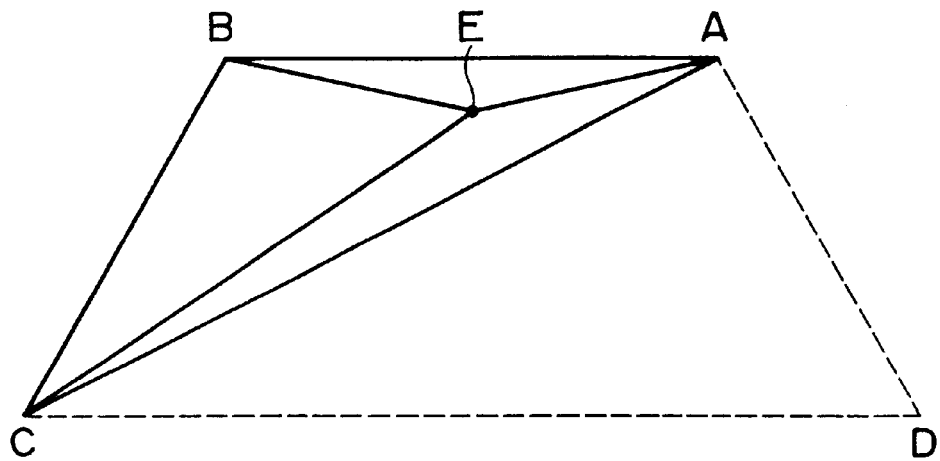
FIGS. 9A and 9B are diagrammatic views illustrating different stages of division of a polygon.
Figure 9B:
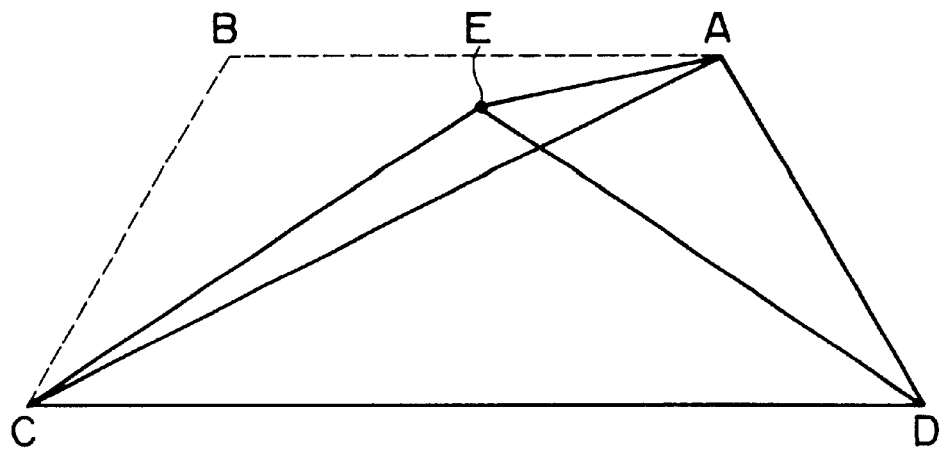

For example, if the polygon shown in FIGS. 8A and 8B is supplied to the programmable packet engine 48, the sub-CPU 95 first divides the quadrangle ABCD into a triangle ABC and another triangle ACD and calculates the display area A of the triangle ABC. Then, if it is discriminated that the display area A is larger than the reference value D, a middle point E is produced as shown in FIG. 9A to produce a sub-polygon ABE and another sub-polygon BCE. Similarly, the display area A of the triangle ACD is calculated, and if it is discriminated that the display area A is larger than the reference value D, then a middle point E is produced as shown in FIG. 9B to produce a sub-polygon ECD and another sub-polygon AED.

Figure 10:
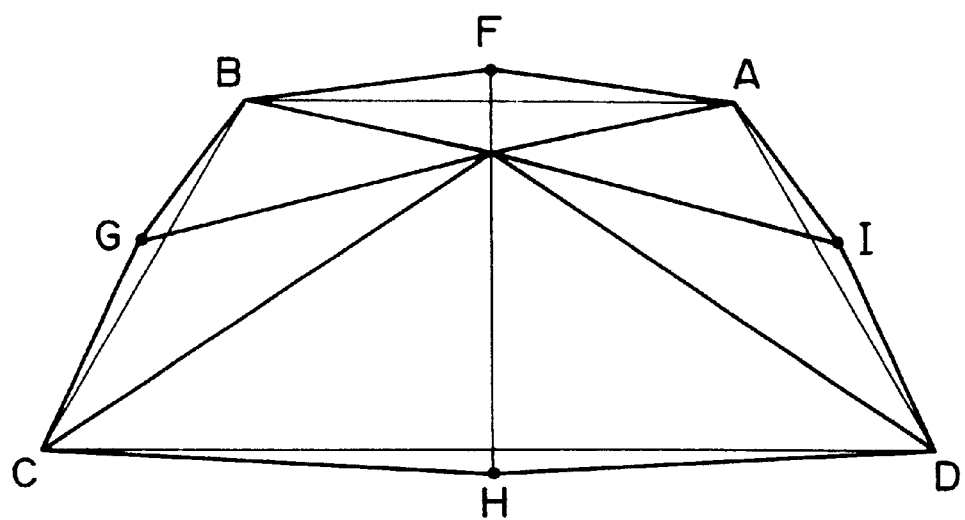
FIG. 10 is a diagrammatic view showing different division of a polygon.

Then, if those sub-polygons (sub-polygon ABE, sub-polygon BCE, sub-polygon ECD and sub-polygon AED) are divided further, then eight sub-polygons are produced as shown in FIG. 10. In this manner, as division is repeated, the curved surface composed of the sub-polygons approaches a spherical surface which is the reference curved surface.

Figure 11A:
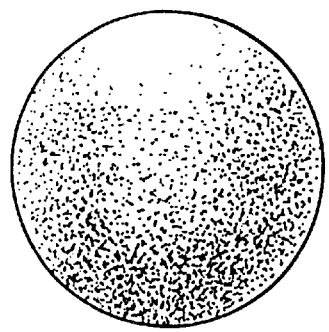
FIGS. 11A to 11D are schematic views illustrating a three-dimensional object displayed in accordance with a variety of Z values.
Figure 11B:
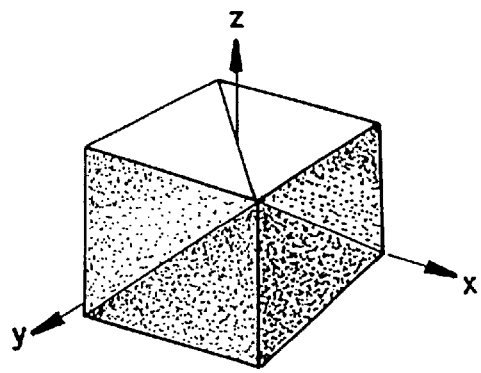
Figure 11C:
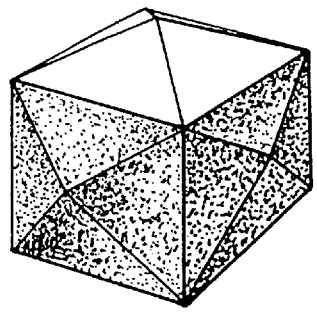
Figure 11D:
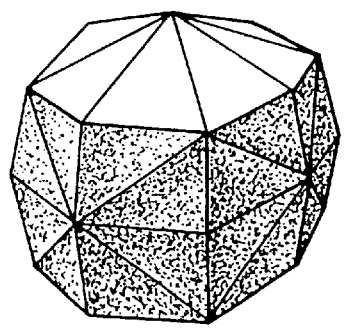

Similarly, when such a spherical object as shown in FIG. 11A is to be represented, if the object is displayed smaller on the predetermined display section, then, for example, a parallelepiped (cube) is displayed with eight apexes (12 polygons) as shown in FIG. 11B. On the other hand, if the object is displayed somewhat larger, then an object nearer to a sphere than the object of FIG. 11B is displayed with 14 apexes (24 polygons) as shown in, FIG. 11C, but, if the object is displayed even larger, then, for example, an object nearer to a sphere than the object of FIG. 11C is displayed with 26 apexes (48 polygons) as shown in FIG. 11D.

Referring back to FIG. 7, in step S6, the graphical processing unit 49 reads out data of the coordinate values of the apexes of the sub-polygons and so forth from the destination data RAM 97 of the programmable packet engine 48. Then, the graphical processing unit 49 produces pixel data of the sub-polygons, writes the pixel data into the frame buffer 58 and performs rendering processing.

In this manner, the polygon is divided in accordance with the Z value and a picture of the polygons obtained by the division (sub-polygons along the reference curved surface) is drawn. By drawing a picture of a predetermined number of polygons, a three-dimensional object composed of those polygons is displayed.

As described above, since geometry calculation such as coordinate conversion is performed by the graphic transfer engine 71 of the main CPU 44 and the programmable packet engine 48 performs only local calculation for the polygons, the circuit scale can be reduced, and a parallel arrangement is allowed.

Figure 12:
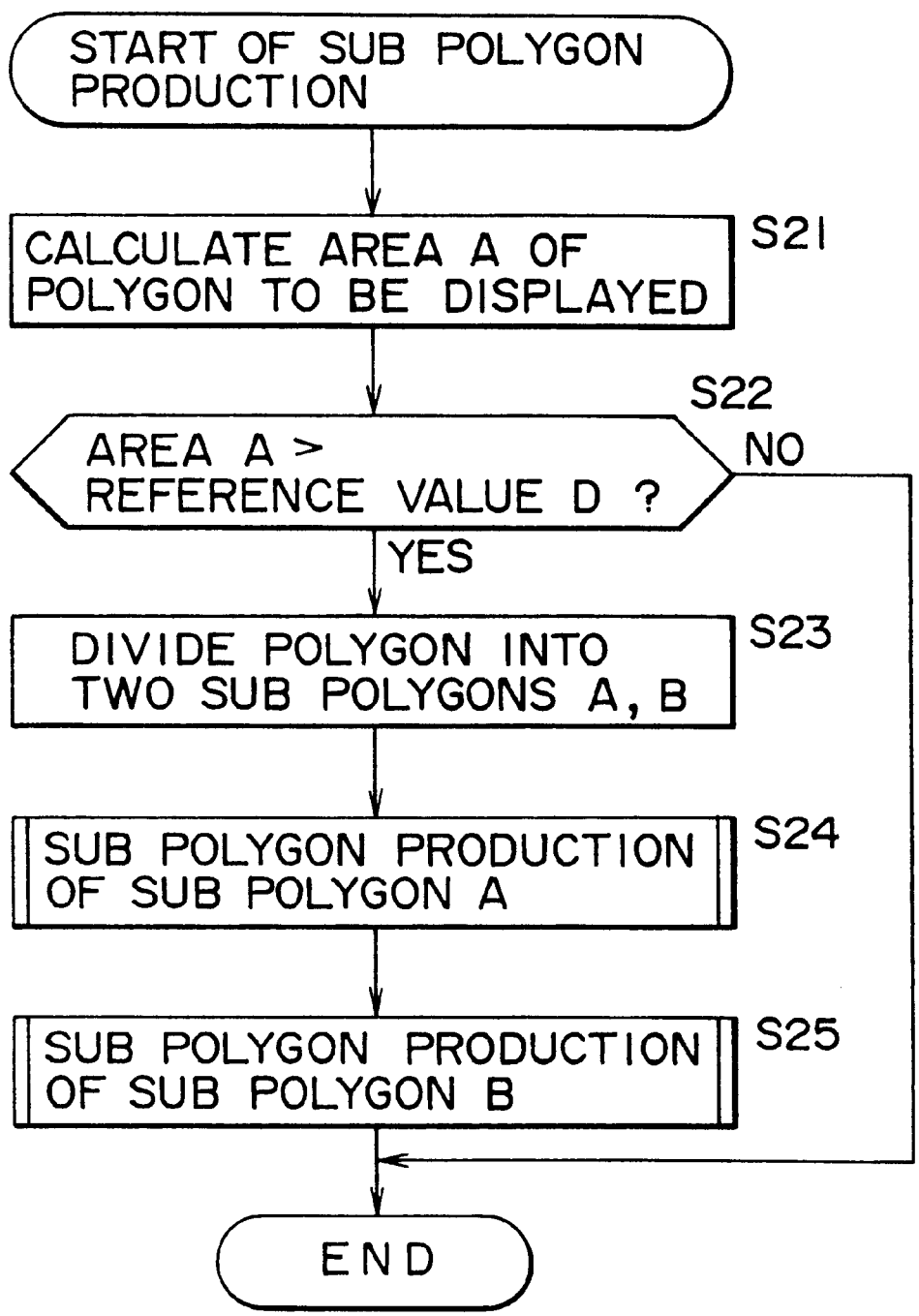
FIG. 12 is a flow chart illustrating details of processing in a polygon dividing step of the flow chart shown in FIG. 5.

Subsequently, details of the dividing processing for a polygon in step S5 will be described with reference to a flow chart of FIG. 12.

First, in step S21, the sub-CPU 95 divides a quadrangular polygon supplied thereto into two triangular polygons and calculates the area A of the triangular polygons (area when the triangular polygons are displayed on the predetermined display section).

Then, in step S22, the sub-CPU 95 discriminates whether or not the area A of the polygons is larger than the predetermined reference value D. If it is discriminated that the area A is larger than the reference value D, then the control sequence advances to step S23. On the other hand, when it is discriminated that the area A is smaller than the reference value D, the sub-CPU 95 ends division of the polygon.

In step S23, the sub-CPU 95 produces a middle point positioned in the middle between two apexes of the polygon in a (u, v) space defined by the parameters u and v, and divides the polygon into two sub-polygons (sub-polygons A and B) with the three apexes of the polygon and the middle point. For example, in FIG. 9A, the middle point E is produced, and the polygon ABC is divided into the sub-polygon ABE and the sub-polygon BCE.

When the apexes of the polygon ABC in the (u, v) space defined by the parameters u and v are, for example, A=(/4, /4), B=((3/4), /4) and C=((5/4), /4), the middle point F between the apexes A and B is calculated as F=( /2, /4) by averaging components of the apexes A and B.

However, where the average ((u1+u2)/2) of the u components of the predetermined two apexes ((u1, v1),(u2, v2)) is , since a point whose u component is not defined by the expressions given hereinabove, the middle point then is determined as (0, /2). Since the average of the u components of the apexes A and C is (=(5/4)–/4), coordinate values of the middle point E between the apexes A and C are (0, /2).

It is to be noted that, if the reference curved surface then is, for example, a spherical surface wherein the radius R is R=1 and the coordinates (xc, yx, zc) of the center are (xc, yc, zc)=(0, –2, 2), then the coordinate values (x, y, z) of the apex A in the three-dimensional space are, from the expression given hereinabove (expression of the spherical surface), (x, y, z)=(1/2, 1/(2/2)–2, 5/2). Similarly, the coordinate values of the apex B are (x, y, z)=(–1/2, 1/($2^{1/2}$)–2, 5/2). Further, the coordinate values of the apex C are (x, y, z) (–1/2, 1/($2^{1/2}$)–2, 3/2). Then, the coordinate values of the middle point E are (x, y, z)=(0, –1, 2).

Further, if perspective conversion is performed for the coordinates of the apexes to obtain two-dimensional coordinate values for displaying, then the coordinate values (X, Y) of the apex A are, from the expression of the perspective conversion given hereinabove, (X, Y) =(1/5, (($2^{1/2}$) –4)/5). Similarly, the coordinate values of the apex B are (–1/5, (($2^{1/2}$) –4)/5). Further, the coordinate values of the apex C are (X, Y) =(–1/3, (($2^{1/2}$) –4)/3). Then, the coordinate values of the middle point E are (x, y)=(0, –1/2).

In this manner, when a middle point is produced in the (u, v) space, the middle point is not disposed at a middle point in the three-dimensional space or the two-dimensional space for displaying, but is disposed on the reference curved surface (FIG. 9A).

Then, in step S24, the sub-CPU 95 performs sub-polygon production processing for the sub-polygon A. In particular, the polygon dividing processing being described at present is performed for the sub-polygon A. For example, polygon dividing processing for the sub-polygon ABE produced in step S23 is started from step S21.

Further, in step S25, the sub-CPU 95 performs sub-polygon production processing for the sub-polygon B.

In particular, the polygon dividing processing being described at present is performed for the sub-polygon B.

By recursively performing this processing in steps S24 and S25 in this manner, each polygon obtained by division is further divided, and the processing is repeated until sub-polygons having sizes smaller than the reference value D are obtained by division. In this instance, since each middle point is produced in the (u, v) space defined by the parameters u and v, a curved surface along the reference curved surface is formed by the polygons obtained by the division as described above.

It is to be noted that, while, in the processing described above, the reference curved surface is a spherical surface, the reference curved surface may be any other curved surface. For example, a polynomial of the parameters u and v given by the following expressions may be utilized as the reference curved surface (x, y, z):

$$x=(1-v)((1-u)x_0+ux_1)+v((1-u)x_3+ux_2)+Nxf(u, v)$$

$$y=(1-v)((1-u)y_0+uy_1)+v((1-u)y_3+uy_2)+Nyf(u, v)$$

$$z=(1-v)((1-u)z_0+uz_1)+v((1-u)z_3+uz_2)+Nzf(u, v)$$

In this instance, while the parameters u and v are kept fixed to four points of (u, v)=(0, 0), (1, 0), (1, 1) and (0, 1) in advance in the program designated by the identifier Code, constants xi, yi, zi (i=0, . . . , 3) are supplied as data to the programmable packet engine 48 so that the coordinate values of the four points in the three-dimensional space are calculated.

f(u, v) of the expressions above is a quadratic expression of the parameters u and v, and coefficients of the terms are supplied as curved surface parameters to the programmable packet engine 48. For example, where f(u, v) is represented by the following expression:

$$f(u, v)=a\ u^2+b7+c\ v^2+d\ v+e$$

the coefficients a to e are supplied as curved surface parameters to the programmable packet engine 48.

Accordingly, in this instance, a packet including the identifier Code and the normal vector Nx, Ny, Nz, the curved surface parameters, the constants xi, yi, zi (i=0, . . . , 3) and color data (RGBi) (i=0, . . . , 3) corresponding to the four points as shown in FIG. 13 is supplied to the programmable packet engine 48. It is to be noted that, by providing a digital differential analyzer (DDA) for the programmable packet engine 48, the expression of the reference curved surface can be calculated simply using a recurrence formula.

The polygon supplied in the form of a packet of data as shown in FIG. 13 is divided in accordance with the Z value by the programmable packet engine 48 in a similar manner as where the reference curved surface is a spherical surface. For example, where the Z value is high and the polygon is disposed far in the depthwise direction, that is, where the polygon is displayed small on the predetermined display section, the sub-CPU 95 of the programmable packet engine 48 does not divide the polygon, or in other words, the division number is set to 1, as seen in FIG. 14A, and stores the coordinate values of the apexes of the polygon into the destination data RAM 97.

On the other hand, where the Z value is rather low and the polygon is disposed rather nearer in the depthwise direction, that is, where the polygon is displayed rather larger on the predetermined display section, the sub-CPU 95 divides the polygon into four, that is, the division number is set to four, as seen in FIG. 14B to produce four sub-polygons in accordance with the reference curved surface, and stores coordinate values of the apexes of the four sub-polygons into the destination data RAM 97.

However, where the Z value is low and the polygon is disposed near in the depthwise direction, that is, where the polygon is displayed large on the predetermined display section, the sub-CPU 95 divides the polygon into 16, that is, the division number is 16, as seen in FIG. 14C to produce 16 sub-polygons in accordance with the reference curved surface and stores coordinate values of the apexes of the 16 sub-polygons into the destination data RAM 97.

Figures 15A, 15B:
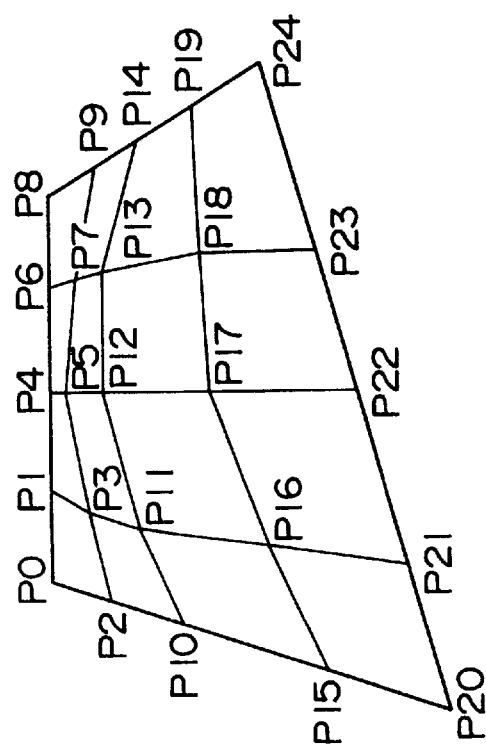
FIG. 15A is a diagrammatic view showing a polygon produced by division of the polygon of FIG. 13.
FIG. 15B is a table illustrating data of the polygon shown in FIG. 15A.

For example, where the polygon is divided into 16 polygons as shown in FIG. 14C, the 16 sub-polygons have 25 apexes P0 to P24 as shown in FIG. 15A. Thus, the sub-CPU 95 arrays coordinate values and color data values (Xi, Yi, Zi, RGBi) (i=0, . . . , 24) of the apexes in such a manner as shown in FIG. 15B and store them in the destination data RAM 97.

It is to be noted that the present example of division makes use of quadrangular polygons (sub-polygons).

In this manner, the shape of an object is varied in accordance with a size (display size) when it is displayed on the predetermined display section, and when the display size is small, an object having a small number of apexes is displayed as a predetermined object and the number of operations necessary for displaying is reduced. On the other hand, where the display size is large, an object having a comparatively large number of apexes is displayed as a predetermined object so that a user may not feel a difference in shape between the original object and the displayed object.

Further, by transmitting data of a polygon of a comparatively rough size to the programmable packet engine 48 and dividing the polygon in accordance with the display area by the programmable packet engine 48, the amount of data to be supplied from the main CPU 44 to the programmable packet engine 48 via the main bus 41 can be reduced to reduce the load to the main bus 41.

While the amount of data (output data amount) outputted from the programmable packet engine 48 to the graphical processing unit 49 increases in accordance with a division number of a polygon as shown in FIG. 16, the amount of data (input data amount) supplied from the main CPU 44 to the programmable packet engine 48 via the main bus 41 is fixed irrespective of the division number of the polygon (in the packet of FIG. 13, 6 words per one polygon). Consequently, the load to the main bus 41 can be fixed. Further, by this means, data are compressed as indicated by a data compression ratio of FIG. 16, and the amount of data to be handled (amount of data communicated along the main bus 41 and so forth) is reduced.

It is to be noted that, since the graphical processing unit 49 effects processing of the individual polygons while holding data of the four apexes of each of them, when the graphical processing unit 49 uses the data of the apexes supplied prior by four or more again, the programmable packet engine 48 supplies the data of the apexes once again. Accordingly, the output data amount (word number) from the programmable packet engine 48 is larger than the number of the apexes of the polygons obtained by the division.

For example, a case wherein data of the polygon of FIG. 15 divided into 16 sub-polygons having totaling 25 apexes P0 to P24 are to be supplied to the graphical processing unit 49 is examined. First, the programmable packet engine 48 supplies the data of the apexes P0 to P3 to the graphical processing unit 49, and the graphical processing unit 49 effects processing of the polygon having the apexes P0 to P3. Then, the programmable packet engine 48 supplies data of the apexes P4 and P5, and the graphical processing unit 49 performs processing of the polygon having the apexes P1, P3, P4 and P5. Similarly, the programmable packet engine 48 supplies data of the apexes P6 to P9 in order, and the graphical processing unit 49 successively performs processing of the polygon having the apexes P4 to P7 and the polygon having the apexes P6 to P9.

Then, the programmable packet engine 48 supplies data of the apexes P2, P3, P10 and P11 to the graphical processing unit 49, and the graphical processing unit 49 performs processing of the polygon having the apexes P2, P3, P10 and P11. Further, the programmable packet engine 48 supplies data of the apexes P5 and P12, and the graphical processing unit 49 performs processing of the polygon having the apexes P3, P5, P11 and P12. Similarly, the programmable packet engine 48 supplies data of the apexes P7, P9, P13 and P14, and the graphical processing unit 49 successively performs processing of the polygon having the apexes P5, P7, P12 and P13 and the polygon having the apexes P7, P9, P13 and P14.

Thereafter, the programmable packet engine 48 supplies data of the apexes P10 to P24 to the graphical processing unit 49 and the graphical processing unit 49 successively performs processing of individual polygons in a similar manner.

Since the programmable packet engine 48 supplies data of the apexes of the individual polygons to the graphical processing unit 49 in such a manner as described above, data of the 15 apexes including the apexes P2, P3, P5, P7 and P9 and the apexes P10 to P19 are supplied twice to the graphical processing unit 49. Accordingly, since data of totaling 40 (=25+15) apexes are supplied to the graphical processing unit 49, the data output amount from the programmable packet engine 48 when the polygon is divided into 16 is 40 words as shown in FIG. 16. Data supplied in this manner are called stripe mesh.

While, in the embodiment described above, curved surface parameters representative of a reference curved surface are supplied to the programmable packet engine 48, a parameter representative of the position of a light source may be supplied together with coordinate values of the apexes of the polygon to the programmable packet engine 48 so that, after the polygon is divided in accordance with the Z value, brightness values of the polygons (sub-polygons) obtained by the division may be calculated from the parameter representative of the position of the light source.

Figures 17A, 17B:
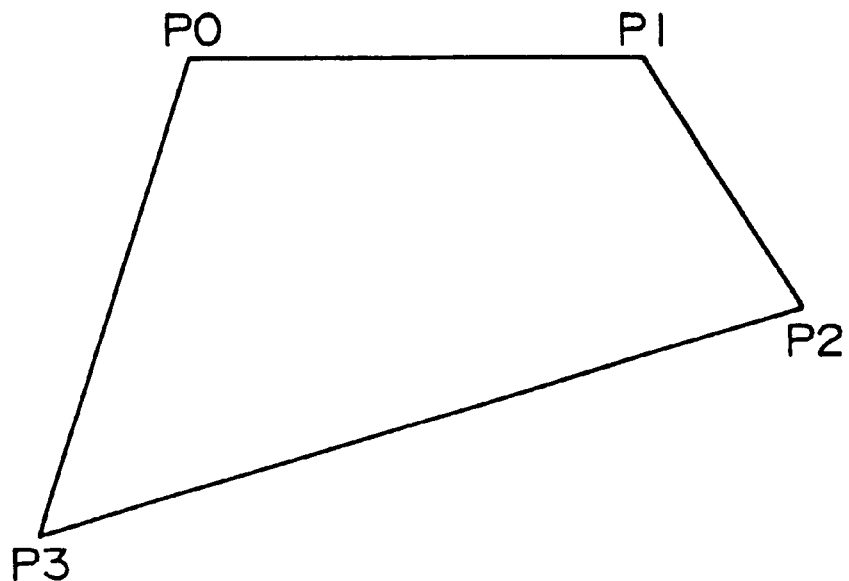
FIG. 17A is a diagrammatic view showing another polygon processed by the game machine of FIG. 1.
FIG. 17B is a table showing a data format of the polygon shown in FIG. 17A.

For example, data including a light source parameter representative of the position of a light source together with coordinate values (Xi, Yi, Zi, (i=0, . . . , 3) of the apexes P0 to P3 of such a polygon as shown in FIG. 17A, a normal vector (Nx, Ny, Nz) and an identifier (Code in FIG. 17A) which designates a program for performing dividing processing of a polygon are recorded in advance on the CD-ROM 40, and the data are read out and stored into the main memory 45. Then, after coordinate conversion of the polygon is performed by the graphic transfer engine 71, those data are supplied as one packet to the programmable packet engine 48 as shown in FIG. 17B by the packet engine 72. Then, the programmable packet engine 48 performs, after division of the polygon, calculation of brightness values of the individual sub-polygons from the light source parameter. It is to be noted that, where a point light source is used, coordinates (Lx, Ly, Lz) of the point light source and color information (Lr, Lg, Lb) of the light source are supplied as light source parameters to the programmable packet engine 48.

Figure 18A:
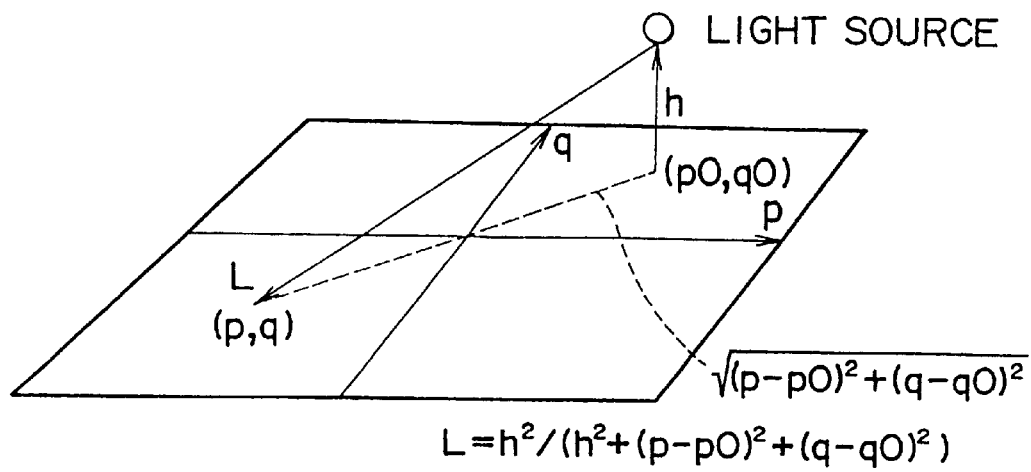
FIGS. 18A to 18C are schematic views illustrating calculation of a brightness value of a polygon produced by division of the polygon of FIGS. 17A and 17B.

The programmable packet engine 48 calculates, from the light source parameters supplied thereto, coordinates (p0, q0) of an intersection point between a normal from the light source and a two-dimensional plane (p, q) including the polygon shown in FIG. 18A and the height h of the light source from the two-dimensional plane (p, q), and further calculates, from coordinate values (p, q) of the apexes of individual sub-polygons, brightness values L (which increase in inverse proportion to the square of the distance from the light source) at the apexes of the sub-polygons in accordance with the following expression:

$$L=h^2/(h^2+(p-p0)2+(q-q0)^2)$$

Figure 18B:
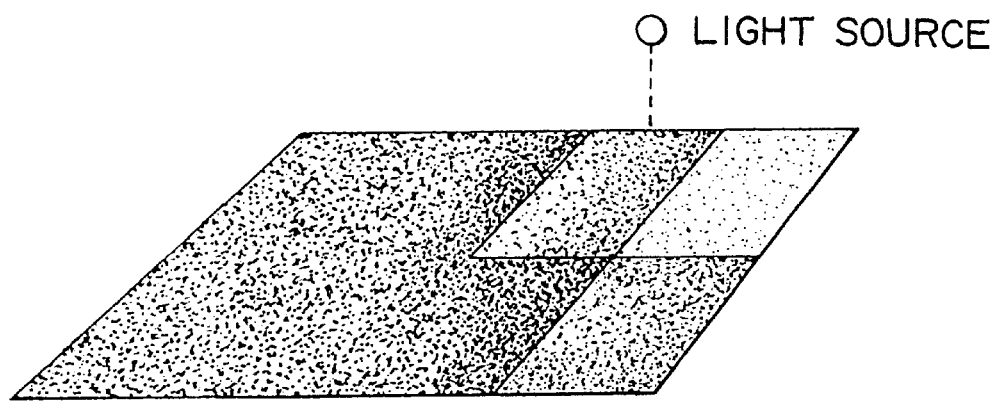
Figure 18C:
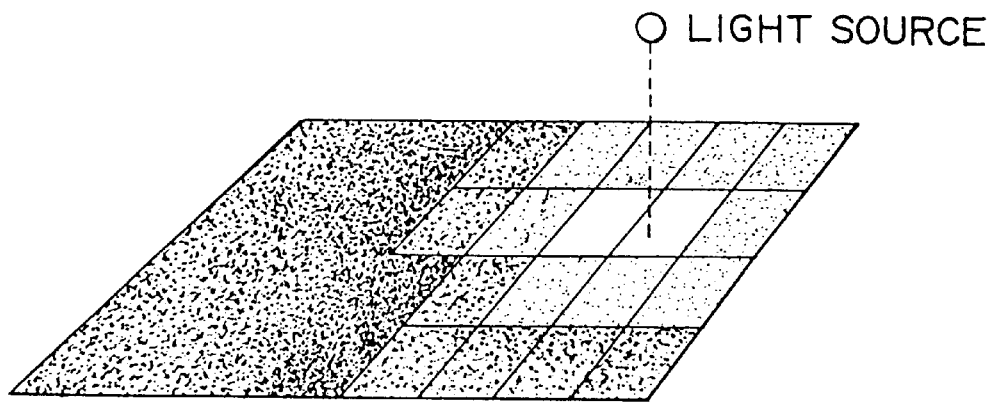

For example, where a polygon is divided into eight sub-polygons, the programmable packet engine 48 calculates the brightness value for each of the apexes of the sub-polygons. Then, the graphical processing unit 49 calculates the brightness values of the sub-polygons from the brightness values of the apexes of the sub-polygons and effects displaying of the polygon as shown in FIG. 18B. Similarly, where a polygon is divided into 32 sub-polygons, the programmable packet engine 48 calculates brightness values for the individual apexes of the sub-polygons. Then, the graphical processing unit 49 calculates the brightness values of the sub-polygons from the brightness values of the apexes of the sub-polygons and effects displaying of the polygon as shown in FIG. 18C.

By calculating the brightness values for individual polygons of a predetermined polygon in this manner, the brightness value of the surface of an object can be varied finely.

Figures 19A, 19B:
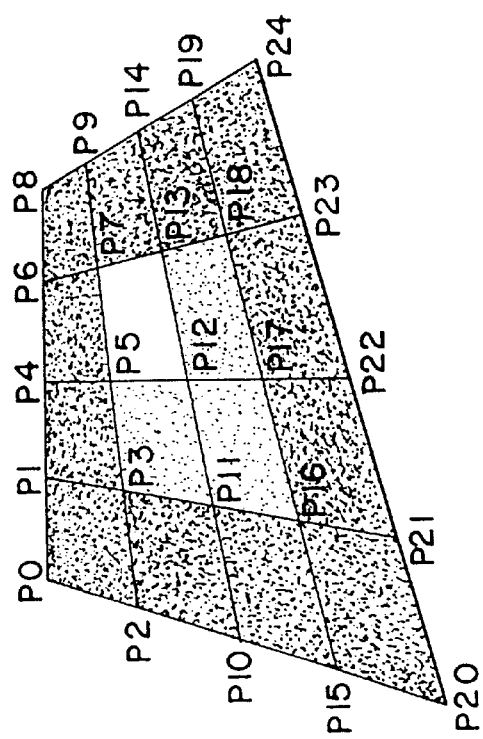
FIG. 19A is a schematic view showing a further polygon produced by division of the polygon of FIG. 17.
FIG. 19B is a table showing a data format of the polygon in FIG. 19A.

Then, the brightness values calculated in this manner for the individual apexes (25 apexes in this instance) of the sub-polygons produced, for example, by 16 division as shown in FIG. 19A are outputted together with the coordinate values of the individual apexes from the programmable packet engine 48 to the graphical processing unit 49 as shown in FIG. 19B (the brightness values are read by the graphical processing unit 49 from the destination data RAM 97 of the programmable packet engine 48).

By dividing a polygon and calculating the brightness values of individual sub-polygons in such a manner as described above, the density in variation of the brightness value can be adjusted in accordance with the display size of the polygon. Further, by this means, since the graphical processing unit 49 is required only to perform linear calculation such as glow shading, or in other words, since the graphical processing unit 49 need not perform complicated light source calculation, the load to the graphical processing unit 49 can be reduced.

It is to be noted that, in this instance, the polygon is divided linearly in the three-dimensional space as shown in FIG. 19A.

Further, while, in the embodiment described above, coordinates of the apexes of a polygon which forms a three-dimensional object are read out from the CD-ROM 40, it is also possible to store a basic object (template (model)) having a three-dimensional basic shape (such as a spherical, cylindrical, cubic or planar shape) into the programmable packet engine 48 (ROM 96) in advance, represent a predetermined three-dimensional object with an identification number (template pattern ID) corresponding to the template and difference values at representative points of the template (deviations between the representative points of the template and points of the three-dimensional object corresponding to the representative points), and record them onto the CD-ROM 40.

Figure 20A:
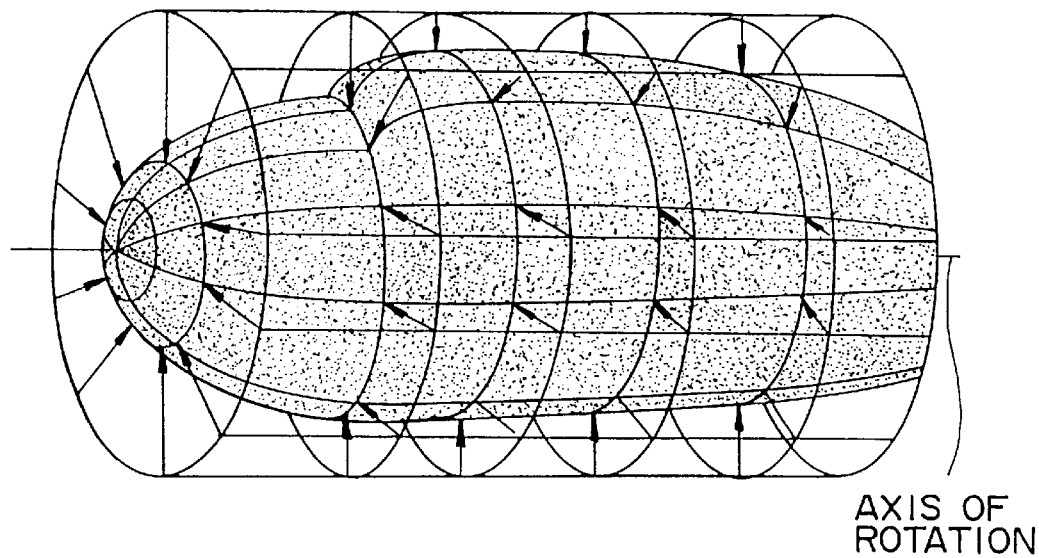
FIGS. 20A and 20B are perspective views showing a three-dimensional object and a corresponding template.
Figure 20B:
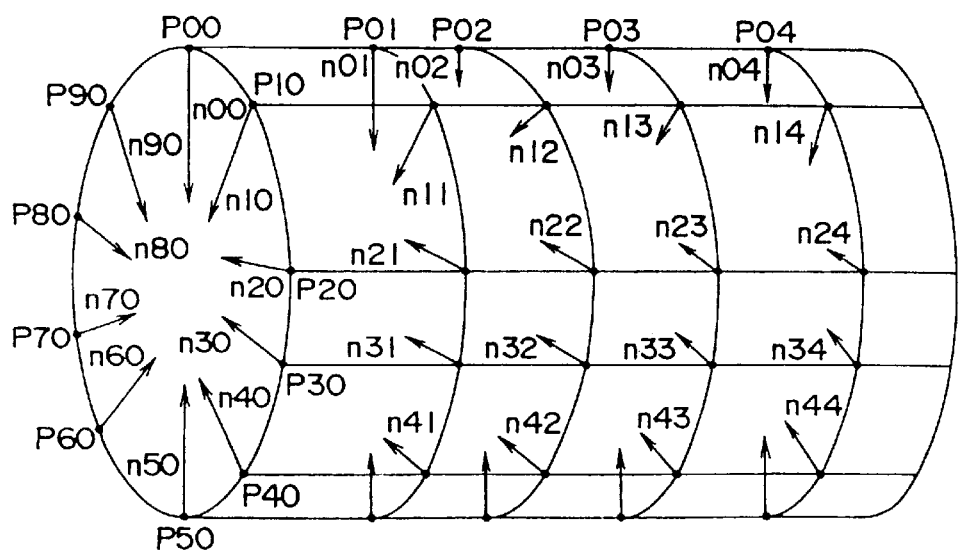

For example, such a shape of a body of rotation as shown in FIG. 20A, that is, a body of rotation symmetrical with respect to a predetermined axis of rotation, is represented by a template pattern ID which designates a cylindrical template shown in FIG. 20B and deviations (difference values) nij from the template at representative points Pij (i=0, ..., 9) of the cylindrical template.

Where such a templates as described above is utilized, the main CPU 44 reads out the template pattern ID, the coordinate values of the object and the deviations nij from the template from the CD-ROM 40, and transmits the numerical values as one packet together with an identifier Code which designates a program for processing this polygon as shown in FIG. 21 to the programmable packet engine 48.

Then, upon reception of the packet, the programmable packet engine 48 performs processing of the data of the three-dimensional object included in the package using a program designated by the identifier Code included in the packet, and refers to the template pattern ID to read out data of a template corresponding to the plate pattern ID from the ROM 96. Then, the programmable packet engine 48 specifies the shape of the three-dimensional object from the data and the deviations nij from the template.

By representing a three-dimensional object with a template pattern ID which designates a template and deviations nij from the template in this manner, the amount of data to be recorded on a CD-ROM or the number of times of operation for coordinate conversion and so forth can be reduced based on the symmetry of the shape of the template. For example, in a cylindrical template as shown in FIG. 20B, the shape shown in FIG. 20A can be represented only with deviations in a radius direction (one-dimensional).

FIG. 22 shows different exemplary production apparatus for producing the CD-ROM 40. The production apparatus of FIG. 22A is constructed such that it records a predetermined three-dimensional object in a data format in units of a polygon shown in FIG. 13. However, the production apparatus of FIG. 22B is a recording apparatus to which the present invention is applied, and is constructed such that it records a predetermined three-dimensional object in a data format which makes use of the template as shown in FIG. 21.

In the production apparatus of FIG. 22A, a modeller 112 receives a signal corresponding to a manual operation of a designer, that is, a person who produces an image, from an inputting apparatus 111 and produces a three-dimensional object in response a manual operation of the designer.

The modeller 112 supplies information regarding a curved surface of the produced three-dimensional object to an operation circuit 113 and supplies coordinate values of the apexes of polygons which form the produced three-dimensional object to a recording apparatus 114.

The operation circuit 113 calculates curved surface parameters corresponding to the individual polygons from the information of the curved surface supplied from the modeller 112 and supplies the curved surface parameters to the recording apparatus 114.

The recording apparatus 114 irradiates a laser beam upon a master disk to record data, that is, recording data, supplied thereto from the modeller 112 and the operation circuit 113 on the master disk. It is to be noted that the master disk has photoresist applied to a surface thereof, and is irradiated by the recording apparatus 114 so as to be optically sensitized in the shapes of pits corresponding to the recording data. Thereafter, the master disk is developed. Then, from the master disk having concaves and convexes on the surface thereof, a stamper is produced. Further, a large number of CD-ROMs as replica disks are produced from the stamper.

By irradiating, upon production of a stamper for CD-ROMS, a laser beam on a master disk in accordance with recording data in this manner, recording data including curved surface parameters and coordinate values of the apexes are recorded onto individual tracks. Then, by further transferring a stamper to which the master disk has been transferred, a CD-ROM having pit shapes corresponding to the recording data is produced.

Subsequently, in the production apparatus of FIG. 22B, a modeller 112 receives a signal corresponding to a manual operation of a designer from an inputting apparatus 111 and produces a three-dimensional object corresponding to a manual operation of the designer.

Then, the modeller 112 supplies information of the produced three-dimensional object to an operation circuit 115 and supplies coordinate values of representative points of the produced three-dimensional object to a recording apparatus 114.

The operation circuit 115 serving as calculation means selects, from within the information of the three-dimensional object supplied from the modeller 112, a template corresponding to the three-dimensional object, calculates an identification number of the template and difference values between representative points of the template and representative points of the three-dimensional object produced by the modeller 112, and supplies the identification number and the difference values to the recording apparatus 114.

The recording apparatus 114 serving as recording means irradiates a laser beam upon a master disk to record recording data (a template pattern ID and difference values at the representative points) supplied thereto from the modeller 112 and the operation circuit 115 onto the master disk. Then, CD-ROMs are produced form the master disk similarly as in the production apparatus of FIG. 22A.

A CD-ROM holding a template pattern ID and difference values at representative points as recorded data thereon is produced in such a manner as described above.

Hence, the present invention satisfies a long existing need for a new and improved recording medium and recording and information processing systems facilitating efficient and high speed processing at reduced cost.

It is to be noted that, while, in the embodiment described above, a CD-ROM is utilized as a recording medium, any other suitable recording medium may be utilized.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. An information processing apparatus comprising:
   calculation means for providing a rendering command including data of a plane figure which forms a three-dimensional object;
   transform means for dividing the plane figure into a plurality of sub-plane figures so that a display area of each of the sub-plane figures is equal to or smaller than a predetermined area, and for generating rendering data of each of the sub-plane figures; and
   rendering means for rendering an image by using the rendering data, wherein,
      said transform means generates the rendering data of each of the sub-plane figures so that the sub-plane figures approximate to a curved surface to be displayed, and
      said sub-plane figures are formed by connecting each of the vertices of said plane figure and a point that is obtained by projecting a middle point between the vertices of said plane figure on the curved surface to be displayed.

2. An information processing apparatus according to claim 1, wherein said transform means generates the rendering data of each of the sub-plane figures when the display area of the plane figure is smaller than the predetermined area.

3. An information processing apparatus according to claim 2, wherein said transform means repeatedly divides the plane figure into the sub-plane figures until the display area of each of the sub-plane figures reaches a predetermined area or smaller.

4. An information processing apparatus according to claim 1, wherein said transform means calculates the number of divided sub-plane figures so that each of the sub-plane figures has a predetermined area or smaller, and for generating the rendering data of each of the sub-plane figures based on the calculated number of divided sub-plane figures.

5. An information processing apparatus according to claim 1, wherein said transform means calculates a luminance value of each of the sub-plane figures based on information which defines a light source.

6. An information processing apparatus according to claim 5, wherein said transform means calculates a luminance value of each vertex of each of the sub-plane figures, and calculates the luminance value of each of the sub-plane figures based on the calculated luminance value of the vertex.

7. An information processing apparatus comprising:
   calculation means for providing a rendering command including data of a plane figure which forms a three-dimensional object;
   transform means for setting a division number based on a position of the plane figure in the depth-wise direction, dividing the plane figure into a plurality of sub-plane figures in accordance with the division number, and for generating rendering data of each of the sub-plane figures; and
   rendering means for rendering an image by using the rendering data, wherein,
      said division number is set larger as the plane figure is positioned nearer in the depth-wise direction, and
      said sub-plane figures are formed by segments which connect the dividing reference points on the curved surface to be displayed and each of the vertices of the plane figure.

8. An information processing apparatus according to claim 7, wherein said transform means generates the rendering data of each of the sub-plane figures so that the sub-plane figures approximate to a curved surface to be displayed.

9. An information processing apparatus according to claim 7, wherein said transform means determines dividing reference points on the curved surface to be displayed according to a predetermined calculation, and determines figures formed by segments which connect the dividing reference points and vertices to the sub-plane figures.

10. An information processing apparatus according to claim 9, wherein each of the dividing reference points is a middle point between the vertices of the plane figure, which is projected on the curved surface.

11. An information processing apparatus according to claim 7, wherein said transform means calculates a luminance value of each of the sub-plane figures based on information which defines a light source.

12. An information processing apparatus according to claim 11, wherein said transform means calculates a luminance value of each vertex of each of the sub-plane figures, and calculates the luminance value of each of the sub-plane figures based on the calculated luminance value of the vertex.

13. An information processing apparatus comprising:
   basic-object storage means for storing coordinate values of representative points of a basic object in a three-dimensional space;
   calculation means for providing a rendering command including difference values between the coordinate values of the representative points of the basic object and coordinate values of an object to be displayed;
   transform means for generating rendering data by obtaining the coordinate values of the representative points of the object to be displayed by subtracting the difference values from the coordinate values of the representative points of the basic object; and
   rendering means for rendering an image by using the rendering data.

14. An information processing apparatus according to claim 13, wherein said basic-object storage means stores a plurality of basic objects provided with identification information for identifying the plurality of basic objects, and said transform means specifies the basic object based on the identification information contained in the rendering command.

15. A recording medium which records:
   data of a plane figure which forms an object in a three-dimensional space; and
   a command code for dividing the plane figure into a plurality of sub-plane figures so that a display area of each of the sub-plane figures is equal to or smaller than a predetermined area, and for generating rendering data of each of the sub-plane figures, wherein,
      said rendering data of each of the sub-plane figures is generated so that the sub-plane figures approximate to a curved surface to be displayed, and
      said sub-plane figures are formed by connecting each of the vertices of said plane figure and a point that is obtained by projecting a middle point between the vertices of said plane figure on the curved surface to be displayed.

16. A recording medium according to claim 15, further comprising:
   information which defines a light source; and
   a command code for calculating a luminance value of each of the sub-plane figures based on the information which defines the light source.

17. A recording medium which records:
   data of a plane figure which forms an object in a three-dimensional space; and
   a command code for dividing the plane figure into a plurality of sub-plane figures formed by segments which connect dividing reference points on the curved surface to be displayed and each of the vertices of the plane figure, by use of a division number which is set larger as the plane figure is positioned nearer in the depth-wise direction, and for generating rendering data of each of the sub-plane figures.

18. A recording medium according to claim 17, further comprising:
   information which defines a light source; and
   a command code for calculating a luminance value of each of the sub-plane figures based on the information which defines the light source.

19. A recording medium which records:
   difference values between coordinate values of the representative points of a basic object in a three-dimensional space, which are stored in storage means within a computer, and coordinate values of an object to be displayed; and
   a command code for generating rendering data by subtracting the difference values from the coordinate values of the representative points of the basic object.

* * * * *